United States Patent [19]
Yamada et al.

[11] Patent Number: 5,519,270
[45] Date of Patent: May 21, 1996

[54] SPINDLE MOTOR AND DISK DRIVE HAVING THE SAME

[75] Inventors: Tomoyoshi Yamada; Yoshifumi Mizoshita; Keiji Aruga, all of Kawasaki, Japan

[73] Assignee: Fujitsu Limited, Kawasaki, Japan

[21] Appl. No.: 106,723

[22] Filed: Aug. 16, 1993

[30] Foreign Application Priority Data

Aug. 19, 1992 [JP] Japan .................................. 4-220379
Sep. 16, 1992 [JP] Japan .................................. 4-246657

[51] Int. Cl.$^6$ ........................... H02K 7/14; H02K 1/12; G11B 17/08
[52] U.S. Cl. .......................... 310/67 R; 310/254; 310/43; 360/98.07
[58] Field of Search ............................. 310/43, 45, 67 R, 310/156, 216, 218, 254, 258; 360/98.07, 99.04, 99.08

[56] References Cited

U.S. PATENT DOCUMENTS

| | | | |
|---|---|---|---|
| 3,124,733 | 3/1964 | Andrews | 310/156 |
| 3,952,219 | 4/1976 | Mitsui et al. | 310/156 |
| 4,051,401 | 9/1977 | Hayward | 310/216 |
| 4,275,426 | 6/1981 | Hoffman | 360/99.04 |
| 4,417,167 | 11/1983 | Ishii et al. | 310/156 |
| 4,539,611 | 9/1985 | Sidhu et al. | 360/99.04 |
| 4,779,165 | 10/1988 | Elsaesser et al. | 310/156 |
| 4,837,474 | 6/1989 | Petersen et al. | 310/254 |
| 4,949,000 | 8/1990 | Petersen | 310/156 |
| 4,980,587 | 12/1990 | Yonei et al. | 310/67 R |
| 4,996,613 | 2/1991 | Hishida | 360/99.08 |

(List continued on next page.)

FOREIGN PATENT DOCUMENTS

| | | |
|---|---|---|
| 54-64212 | of 1979 | Japan . |
| 57-109391 | 7/1982 | Japan . |
| 58-157360 | 9/1983 | Japan . |
| 59-76146 | 5/1984 | Japan . |
| 59-123450 | 7/1984 | Japan . |
| 60-25381 | 2/1985 | Japan . |
| 60-42082 | 3/1985 | Japan . |
| 60-66282 | 5/1985 | Japan . |
| 60-119886 | 8/1985 | Japan . |
| 61-192068 | 8/1986 | Japan . |
| 61-236351 | 10/1986 | Japan . |
| 62-61184 | 4/1987 | Japan . |
| 62-70668 | 5/1987 | Japan . |
| 62-88471 | 6/1987 | Japan . |
| 63-18951 | 1/1988 | Japan . |
| 1-86454 | 6/1989 | Japan . |
| 1-315244 | 12/1989 | Japan . |
| 2-62425 | 3/1990 | Japan . |
| 2-193554 | 7/1990 | Japan . |
| 3-15255 | 1/1991 | Japan . |
| 3-108178 | 5/1991 | Japan . |
| 3-77269 | 8/1991 | Japan . |
| 3-212148 | 9/1991 | Japan . |
| 3-253240 | 11/1991 | Japan . |
| 3-277157 | 12/1991 | Japan . |
| 3-285545 | 12/1991 | Japan . |
| 4-58753 | 2/1992 | Japan . |

OTHER PUBLICATIONS

M. Iwana, "Technical Trend in spindle motors for HDD", Denpa Shinbunsha, Sep. 3, 1992.

*Primary Examiner*—Clayton E. Laballe
*Attorney, Agent, or Firm*—Armstrong, Westerman, Hattori, McLeland & Naughton

[57] ABSTRACT

A spindle motor includes a permanent magnet multipolarized in a circular direction of the permanent magnet. The permanent magnet generates magnetic fluxes in a radial direction of the spindle motor. A core assembly has core pieces, the core pieces respectively including first portions are circularly arranged and face the permanent magnet via a gap, and second portions guide magnetic fluxes in parallel with a rotation axis of the spindle motor. Windings are turned around the second portions of the core assembly and have axes of the windings extending in parallel with the rotation axis of the spindle motor. A yoke magnetically couples the core pieces with each other.

43 Claims, 28 Drawing Sheets

U.S. PATENT DOCUMENTS

| | | | |
|---|---|---|---|
| 5,025,336 | 6/1991 | Morehouse et al. | 360/97.02 |
| 5,025,355 | 6/1991 | Stefansky | 360/97.01 |
| 5,045,738 | 9/1991 | Hishida et al. | 310/90 |
| 5,138,209 | 8/1992 | Chuta et al. | 310/67 R |
| 5,195,002 | 3/1993 | Sakurai | 360/99.08 |
| 5,298,825 | 3/1994 | Oudet et al. | 310/156 |
| 5,412,522 | 5/1995 | Lockhart et al. | 360/99.08 |

FIG. IIB
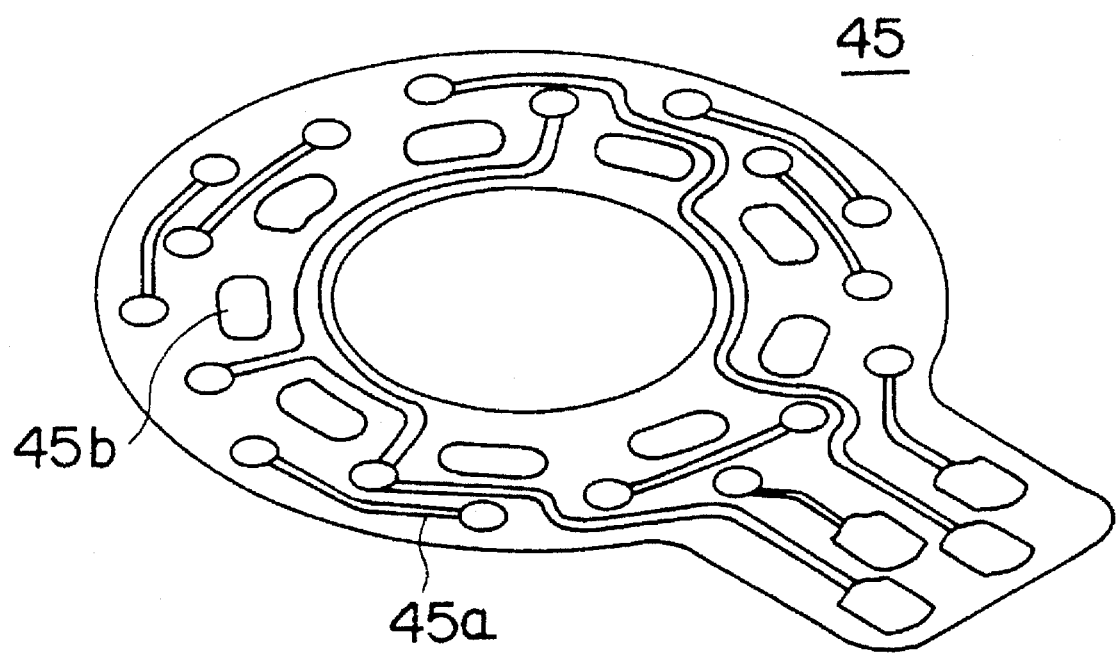

SPINDLE MOTOR AND DISK DRIVE HAVING THE SAME

BACKGROUND OF THE INVENTION

1. Field of the Invention

The present invention generally relates to a spindle motor suitable for a disk drive that can be utilized as an external memory of a computer system, such as a magnetic disk or magneto-optical disk. More specifically, the present invention is concerned with a whole construction of a disk drive having a housing of a credit card type, a circuit assembly thereof and the spindle motor.

2. Description of the Related Art

Generally, disk drives, e.g., magnetic disk drives, having at least one magnetic disk utilized as a recording medium, have been in practical use in various areas including computer systems as non-volatile memory devices. Further, in recent years, improvements in the technology of the magnetic disk drives, such as increasing the magnetic recording density of the magnetic disk, have been realized, leading to down-sizing of magnetic disk drives per se. On the other hand, computer systems, etc., have been becoming more compact, lighter in weight and lower in power consumption, as represented by a portable personal computer, owing to recent rapid development of microelectronics.

Though down-sizing of the technology of the magnetic disk drive has progressed recently as described above, the dimensions of related apparatuses are still too large, the apparatuses are too heavy and the power consumption thereof is too high if a magnetic disk having a diameter of 2.5 inches is utilized. Therefore, it may be difficult for the current magnetic disk drives to be applied to the above portable personal computers for which compactness, lighter weight and lower power consumption are required. To meet this requirement, a magnetic disk drive utilizing a magnetic disk with a diameter of 1.89 inches has been recently announced in public. The magnetic disk drive surely has smaller dimensions than the magnetic disk drive with a diameter of 2.5 inches. However, in such a magnetic disk drive comprising a magnetic disk with a diameter of 1.89 inches, down-sizing of the magnetic disk drive has been attempted by using the prior art without making any improvements therein. Therefore, problems exist in that the dimensions of the above magnetic disk drive, especially the thickness or height thereof, are still too large for the disk drive to be practically used as a portable device (nowadays, it is generally well known that the lower limit of the thickness thereof is as large as 10 mm).

Further, a modular unitary disk file subsystem has been disclosed in U.S. Pat. Nos. 4,639,863 and 4,860,194, wherein an elongated printed circuit board is directly attached to the side of a housing including a head and disk assembly so as to attain thinner dimensions. However, a concrete thickness value in such a construction is not disclosed in these prior art disclosures. Moreover, even though the thickness of the disk drive can be reduced successively, a new problem would occur in that the area of the disk drive including the printed circuit board and the housing is larger than usual.

Taking these conditions into account, in a known portable personal computer or the like currently in use, an integrated circuit (IC) memory card is provisionally utilized, rather than a magnetic disk, so that the required dimensions and weight can be attained. The specifications of this IC memory card have been standardized recently {the standard specification of JEIDA (Japan Electronic Industry Development Association) and PCMCIA (Personal Computer Memory Card International Association)}, where the thickness or height of the card is defined as 5 mm or 3.3 mm. A card satisfying these standard specifications is sufficiently thin and sufficiently light, and therefore the above card can be suitable for application to a portable personal computer, etc., in view of dimensions and weight.

However, presently, there are two significant disadvantages in the above IC memory card as follows.

First, computer systems utilizing the IC memory card are extremely expensive. More concretely, the cost per megabyte thereof is several tens of thousands of yen/MByte, which is several hundred times higher than a computer system utilizing the flexible disk drive and is several tens of times higher than that utilizing the hard disk drive (i.e., magnetic disk drive).

Second, the whole storage capacity of a computer system utilizing the above IC memory card is not always sufficient to comply with current user requirements. Currently, an IC memory card having a storage capacity of approximately 1 MByte is widely used. In the future, the storage capacity of the IC memory card will be increased up to the order of several MBytes to 10 MBytes. On the other hand, presently, in the ideal portable personal computer, a memory system having more than 40 MBytes is actually required. Accordingly, the computer system utilizing the above IC memory card cannot substantially satisfy the current requirements for storage capacity. Moreover, in the near future, the above storage capacity required by users will be expected to increase more and more. Therefore, it will be difficult for the storage capacity of the IC memory card to catch up with the required storage capacity, even taking into account the progress of IC memory technology.

As described above, if a magnetic disk drive according to the prior art is to be utilized for a portable personal computer, it will be sufficient in respect to cost and storage capacity thereof, but it is not sufficient in respect to dimensions, weight, power consumption and durability against mechanical shock. On the contrary, the IC memory card currently utilized for portable personal computers is sufficient in respect to dimensions, weight, power consumption and durability against mechanical shock, however, the cost of the IC memory card is too expensive and the storage capacity thereof is not always satisfactory for the users. Therefore, in order to realize a suitable portable personal computer, a memory device that has the advantages of both the magnetic disk drive and the IC memory card is strongly desired.

As a strategy for overcoming the abovementioned difficulties, it is considered effective to utilize the specifications of a type III PCMCIA. In this type III PCMCIA, the same dimensions as type I and type II are defined in respect to plane directions, while the thickness dimensions are allowed to be a maximum value of 10.5 mm. If one connector conforming to the type III of PCMCIA is provided, a card having thickness of 10.5 mm can be inserted into two different kinds of slots of the type I and type II arranged in a vertical direction.

As described above, if the thickness dimension is specified to be 10.5 mm, a disk drive of a card type can be realized using the prior art without any improvements. Actually, a device having a thickness of 10.5 mm has already been announced. However, down-sizing of the device is required for personal computers, particularly notebook type personal computers, and therefore, a structure such that the two slots are arranged along a vertical dimension may be disadvantageous in terms of down-sizing. On the other hand, in palm top type personal computers, only one slot can be provided in each personal computer. In other words, it is now difficult for memory devices in all areas that IC memory cards are utilized to be replaced with magnetic disk drives. Therefore, it is strongly desired that magnetic disk drives having outer dimensions conforming to type I or type II (i.e., disk drives with a thickness equal to or less than 5 mm) be realized.

In order to produce the above magnetic disk drives, it is required to improve a spindle motor for driving a disk. As the size of disks is reduced, the diameter of the center hole of the disks is reduced (the diameter of the center hole of a disk with a diameter of 1.89 inches is 12 mm). Hence, it is strongly desired to diminish the size of spindle motors for use in disk drives.

The inventors note that various disk drives and spindle motors have been proposed in, for example, U.S. Pat. No. 5,025,355, U.S. Pat. No. 5,025,336, Japanese Laid-Open Patent Publication No. 3-212148 (corresponding to U.S. patent application Ser. No. 424,673), U.S. Pat. No. 4,980,587, U.S. Pat No. 4,996,613, U.S. Pat. No. 5,045,738, U.S. Pat. No. 5,138,209, Japanese Laid-Open Patent Publication Nos. 2-62425, 3-253240, 3-277157, or Japanese Laid-Open Utility Model Publication Nos. 1-86454 and 3-77269, or M. Iwana, "Technical Trend in spindle motors for HDD", Denpa Sinbunsha, Sep. 3, 1992. The inventors also note the following documents: Japanese Laid-Open Patent Publication Nos. 57-109391, 58-157360, 59-76146, 59-123450, 61-192068, 61-236351, 63-18951, 1-315244, 2-193554, 3-15255, 3-108178 and 4-58753, and Japanese Laid-Open Utility Model Publication Nos. 54-64212, 60-25381, 60-42082, 60-66282, 60-119886, 62-61184 and 62-70668.

SUMMARY OF THE INVENTION

It is an object of the present invention to provide a spindle motor making it possible to assemble disk drives having diminished dimensions, particularly having a thickness equal to or less than 5 mm and improved efficiency.

This object of the present invention is achieved by a spindle motor comprising: a permanent magnet multipolarized in a circular direction of the permanent magnet, said permanent magnet generating magnetic fluxes in a radial direction of the spindle motor; a core assembly having core pieces, the core pieces respectively comprising first portions that are circularly arranged and face the permanent magnet via a gap, and second portions guiding magnetic fluxes in parallel with a rotation axis of the spindle motor; windings that are wound around the second portions of the core assembly and have axes of the windings extending in parallel with the rotation axis of the spindle motor; and a yoke magnetically coupling the core pieces with each other.

Another object of the present invention is to provide a disk drive comprising the above-mentioned spindle motor.

This object of the present invention is achieved by a disk drive comprising: a disk that stores information; a spindle motor for rotating the disk; a head assembly that performs read/write operations on the disk; a head positioning actuator supporting the head assembly and positioning the head assembly on a desired position on the disk; and control means for receiving read signals from the head assembly and providing write signals to the head assembly and for controlling the spindle motor and the head positioning actuator. The spindle motor has the structure as mentioned above.

BRIEF DESCRIPTION OF THE DRAWINGS

Other objects, features and advantages of the present invention will become more apparent from the following detailed description when read in conjunction with the accompanying drawings, in which:

FIG. 8B is a side view of the armature core shown in FIG. 8A;

FIG. 11B is a perspective view of a flexible printed circuit board used in the first embodiment of the present invention;

DESCRIPTION OF THE PREFERRED EMBODIMENTS

In order to facilitate understanding of the present invention, a description will now be given of conventional spindle motors suitable for magnetic disk drives.

Figure 1:
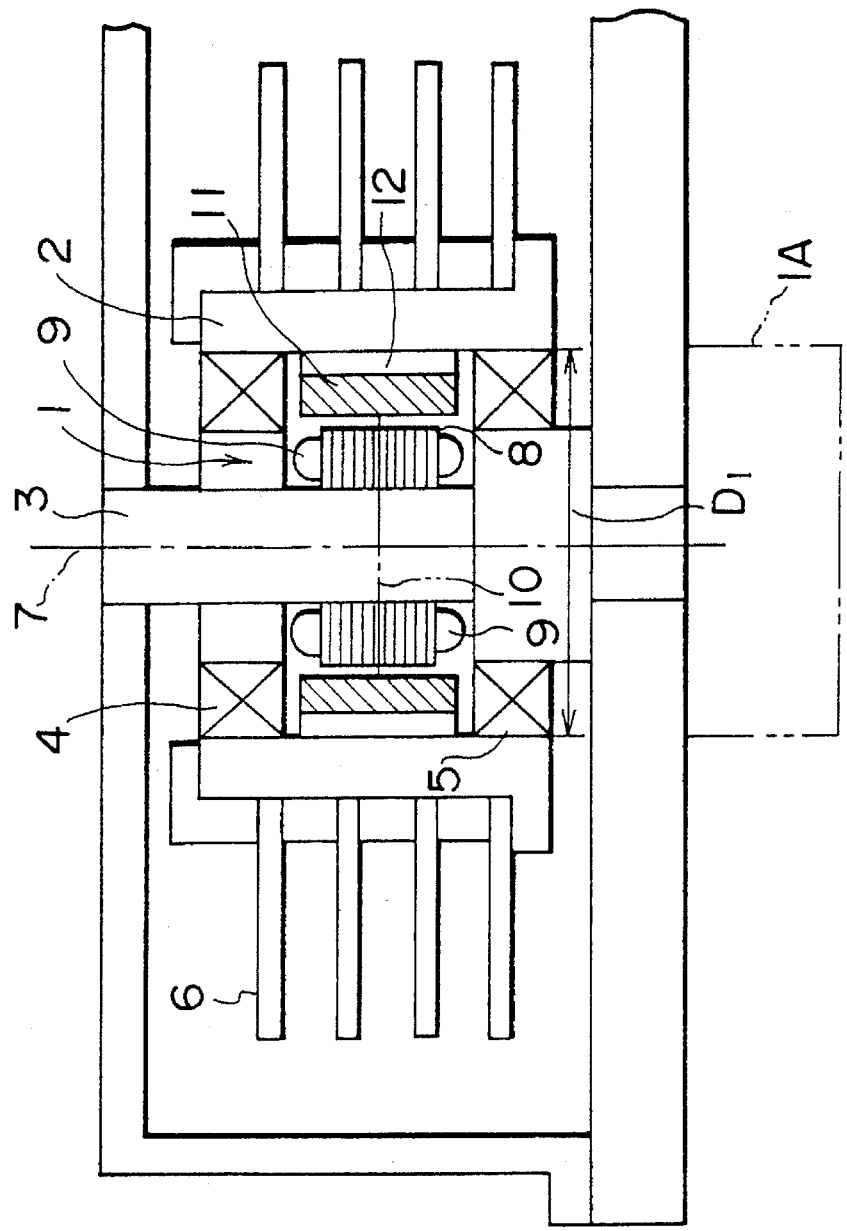
FIG. 1 is a cross-sectional view of a conventional spindle motor for use in a disk drive.
Figure 2:
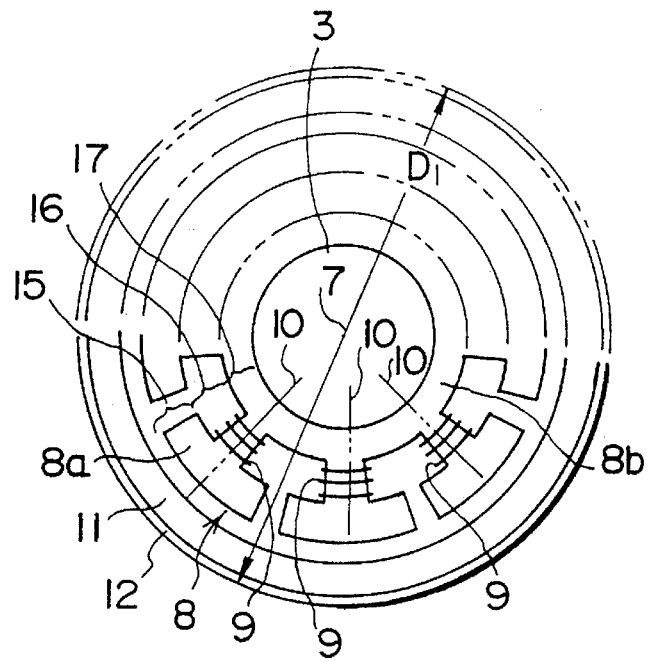
FIG. 2 is a plan view of the conventional spindle motor shown in FIG. 1.

Referring to FIGS. 1 and 2, a conventional spindle motor for use in disk drives includes a hub 2, which is rotatably supported by bearings 4 and 5 fixed to a stationary shaft 3. One or a plurality of disks 6 vertically spaced apart from each other are fixed to the hub 2, and are rotated about a disk rotation axis 7. A spindle motor to rotate the disks 6 is provided inside the hub 2 and located in a space between the bearings 4 and 5. An armature core 8 is fixed to the stationary shaft 3. Windings 9 are wound around the armature core 8 so that winding axes 10 of the windings 9 are perpendicular to the stationary shaft 3. A ring-shaped permanent magnet 11 (radial-anisotropic magnet) multipolarized in the circular direction thereof is fixed to an inner peripheral wall of the hub 2 through a rotor yoke 12. First portions 8a of the armature core 8 face the ring-shaped permanent magnet 11 in the radial direction of the spindle motor 1 (or the disks 6).

The conventional spindle motor 1 shown in FIGS. 1 and 2 needs ring-shaped spaces 15, 16 and 17 arranged side by side in the radial direction of the spindle motor 1 because the first portions 8a of the armature core 8 and the windings 9 are arranged side by side in the radial direction of the spindle motor 1. The ring-shaped space 15 is needed to accommodate the first portions 8a of the armature core 8. The ring-shaped space 16 is needed to accommodate the windings 9. The ring-shaped space 17 is needed to accommodate a second portion 8b of the armature core 8, the second portion 8b functioning as a stator yoke. Hence, the spindle motor 1 has a large diameter D1, which prevents downsizing of the spindle motor 1. In actuality, it is necessary to dispose the bearings 4 and 5 side by side in the direction of the disk rotation axis 7 if the spindle motor 1 is applied for 1.89-inch disk drives, as shown in FIG. 1. Hence, it is impossible to reduce the thickness or height of the spindle motor 1 and thus the thickness or height of the disk drives.

It may be possible to arrange a spindle motor for rotating the disks 6 on a down surface side of a chassis base of a disk drive, as shown by a two-dot chained line in FIG. 1. However, such a disk drive has a large thickness and prevents thinning of the disk drive.

Figure 3:
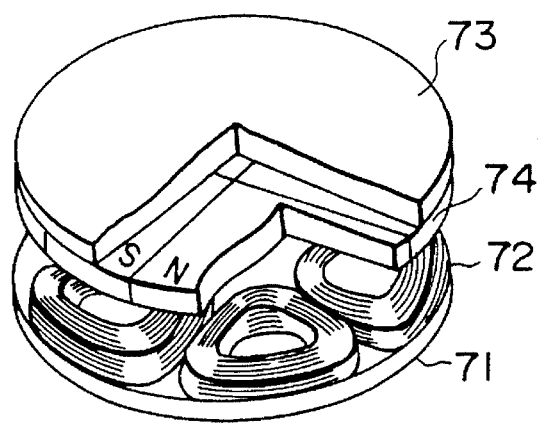
FIG. 3 is a perspective view of another conventional spindle motor.
Figure 4:
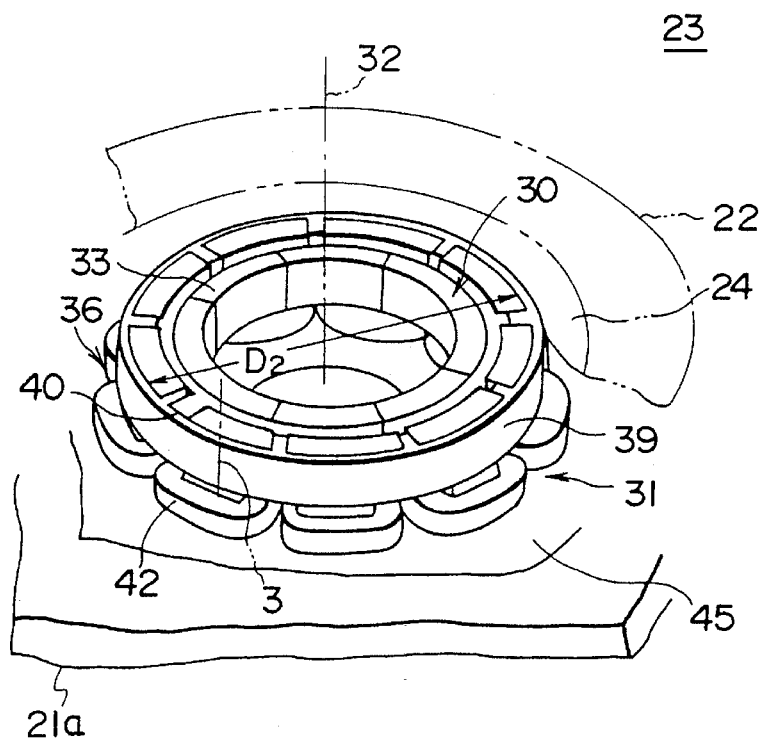
FIG. 4 is a perspective view of a spindle motor according to a first embodiment of the present invention.

FIG. 3 shows another conventional spindle motor (flat motor) 70 of an axial-gap type. The flat motor 70 is made up of a stator yoke 71, stator windings 72, a rotor yoke 73 and a rotor magnet 74. The flat motor 70 does not have, with a limited space, a sufficient radial distance contributing to generation of torque by means of the stator windings 72, and hence does not have satisfactory efficiency. Further, the flat motor 70 is a so-called slotless type motor with air-cored windings. Hence it is difficult to increase a high gap magnetic flux density and enhance efficiency, as compared with a motor having cores. Furthermore, a magnetic pull is exerted in the axial direction and hence shortens the lifetime of the bearings. Moreover, it is liable that a vibration occurs in the axial direction and induces another vibration of the disk surfaces during rotation.

In a radial-gap type spindle motor, magnetic pulls occur in the radial direction of the motor and are mutually canceled by each other. Hence, the bearings do not have a load due to the magnetic pulls. In this regard, the radial-gap type spindle motor is advantageous to the axial-gap type spindle motor, and has a longer lifetime and more stable rotation in the axial direction than the latter type motor.

It can be seen from the above that a compact radial-gap type spindle motor is suitable for a thin disk drive having a disk with a diameter of 3.5 or less, particularly, 1.89 inches.

A description will now be given, with reference to FIGS. 4, 5, 6, 7A, 7B, 8A, 8B, 9, 10A, 10B, 11 and 12, of a spindle motor according to a first embodiment of the present invention. A disk drive 20 according to the first embodiment of the present invention has an enclosure 21 which accommodates a magnetic disk 22 with a diameter of 1.89 inches, and a disk driving spindle motor 23. The enclosure 21 is composed of a chassis base 21a and a cover 21b, and the same dimensions as the IC memory card (85.6 mm×54 mm× 5 mm).

A hub 24 is rotatably supported by a stationary shaft 25 fixed to the enclosure 21 by means of a pair of bearings 26 and 27. The hub 24 engages a center hole 22a of the disk 22 and is fixed thereto. The hub 24 is made of a ferromagnetic material, such as iron, and has a ring-shaped recess portion 28. The hub 24 functions as a rotor yoke of the spindle motor.

Figure 6:
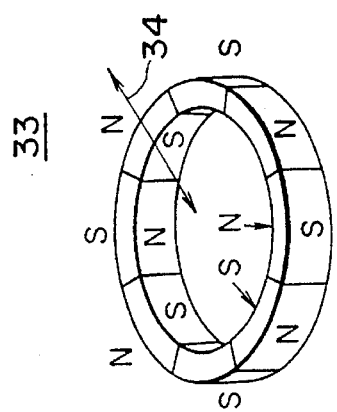
FIG. 6 is a perspective view of a permanent magnet used in the first embodiment of the present invention.
Figure 7B:
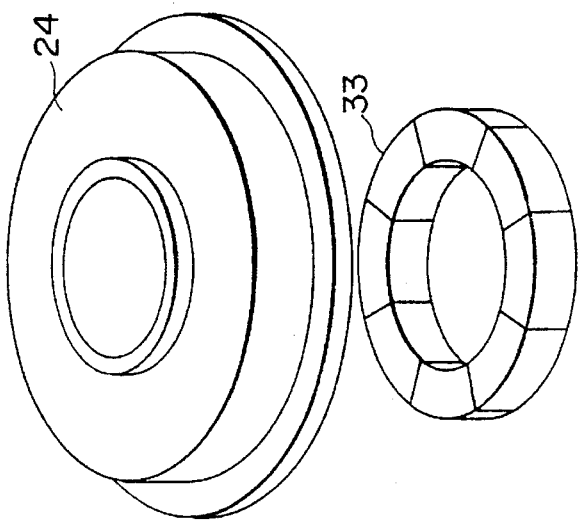
FIGS. 7A and 8B are exploded perspective views of a hub and the permanent magnet used in the first embodiment of the present invention.
Figure 7A:
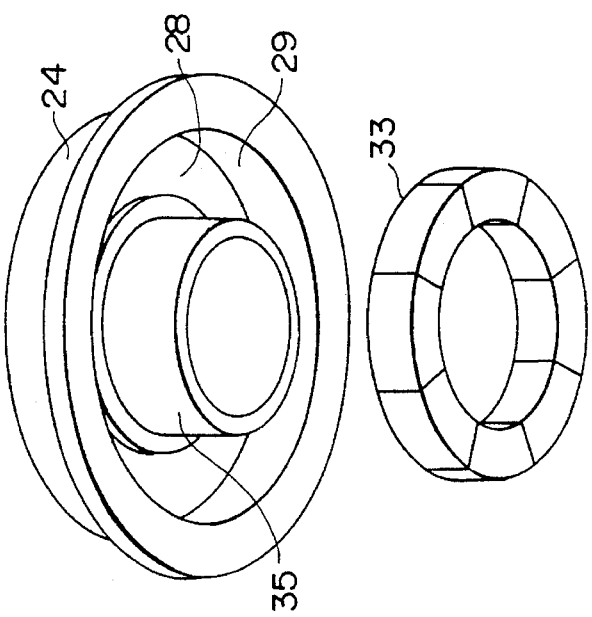

The motor 23 is of the radial-gap type, and includes a rotor 30 and a stator 31. As will be described layer, the motor 23 is also of an inner rotor type in which a ring-shaped permanent magnet is further out than an armature core with respect to the axis of the motor 23. The rotor 30 having a rotation axis 32 is provided inside the stator 31. The rotor 30 includes the hub 24 and a ring-shaped permanent magnet 33. As shown in FIG. 6, the ring-shaped permanent magnet 33 is radially magnetized so that it has 8 or 12 poles arranged in the circular direction of the magnet 33. An arrow 34 indicates the magnetized direction. An inner peripheral wall of the ring-shaped permanent magnet 33 is fixed to an inner wall 35 of the hub 24. The inner wall 35 is a part of the ring-shaped recess portion 28. The hub 24 is made of a ferromagnetic material, and hence functions as a yoke for the permanent magnets 33. This structure of the motor 23 contributes to down-sizing.

Figure 8A:
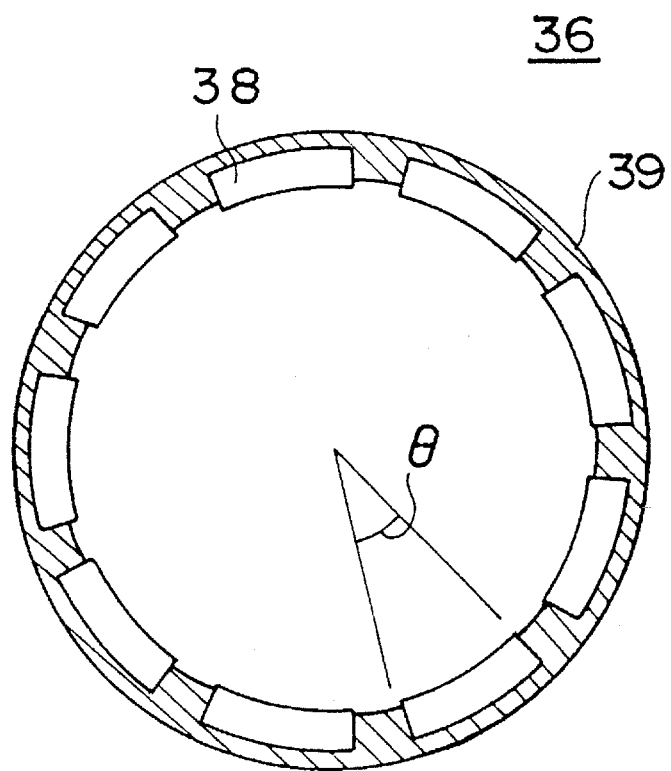
FIG. 8A is a plan view of an armature core used in the first embodiment of the present invention.
Figure 8B:
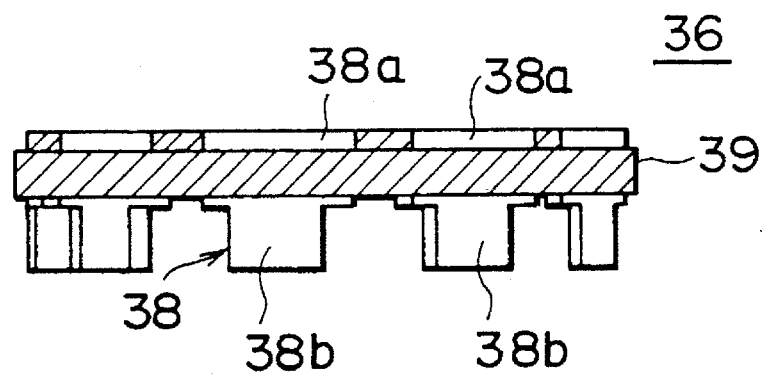

The stator 31 is made up of a core assembly 36, windings 42 and the chassis base 21a that functions as a stator yoke. As shown in FIGS. 8A and 8B, nine core pieces 38 made of, for example, soft iron, Permendur (Co-Fe), permalloy (Ni-Fe alloy), silicon iron (Fe-Si), Sendust (Fe-Si-Al), ferro nitride (Fe-N) or soft ferrite are arranged at identical intervals in the circular direction. It is also possible to form the core pieces 38 comprising resin containing magnetic powders. The nine core pieces 38 are integrally fixed by a ring member 39 made of, for example, synthetic resin such as polyphenylene sulfite with glass fibers being contained therein. The pieces 38 are held so that the head portions 38a are approximately embedded in the ring member 39.

Figure 9:
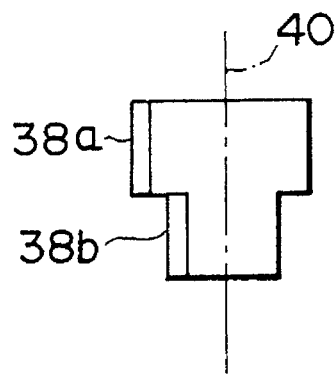
FIG. 9 is a side view of a core piece of the armature core.

As shown in FIG. 9, each of the core pieces 38 includes an upper (first) portion 38a and a lower (second) portion 38b arranged along a straight axis 40. The upper portion 38a is wider than the lower portion 38b. The total length of the upper portion 38a and the lower portion 38b along the axis 40 is less than 4.0 mm, for example, 2.3 mm. The core pieces 38 can be produced by metal injection molding, press molding, press working or casting. The core pieces are made of silicon steel in order to reduce the iron loss and obtain a high permeability $\mu$ and a high saturation magnetic flux density Bs.

As shown in FIG. 8A, each of the upper portions 38a has a length in the circular direction so that an angle $\theta$ formed by lines connecting two ends of each of the upper portions 38a to the center of the motor is approximately between 30° and 38° when the nine core pieces 38 are used. The angle formed by lines connecting two ends of each of the lower portions 38b to the center of the motor is less than the angle $\theta$ formed by the lines connecting two ends of each of the upper portions 38a to the center of the circular arrangement of the core pieces 38.

Figure 5:
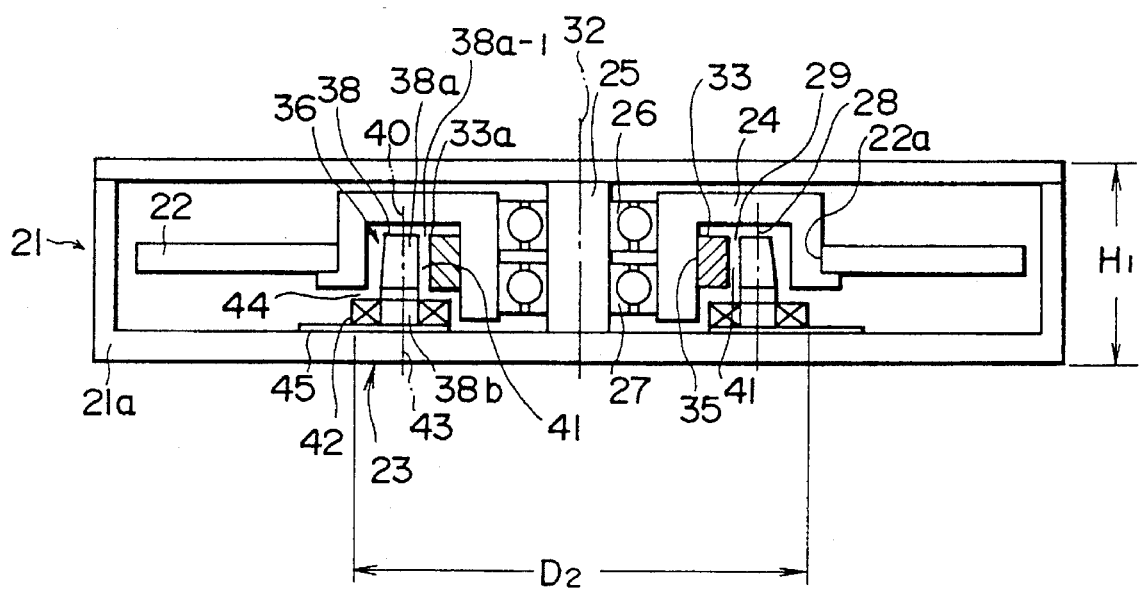
FIG. 5 is a cross-sectional view of a disk drive having the spindle motor according to the first embodiment of the present invention.

As shown in FIG. 5, the upper portions 38a of the core pieces 38 are located in a ring-shaped space 29 defined by the recess portion 28 of the hub 24. Inner surfaces of the upper portions 38a face an outer peripheral surface 33a of the ring-shaped permanent magnet 33 via radial gaps 41. The ring-shaped permanent magnet 33 can be an integrally formed magnet or comprised of a plurality of permanent magnet segments arranged in the circular form and fixed to the hub 24 by means of an adhesive.

Figure 10A:
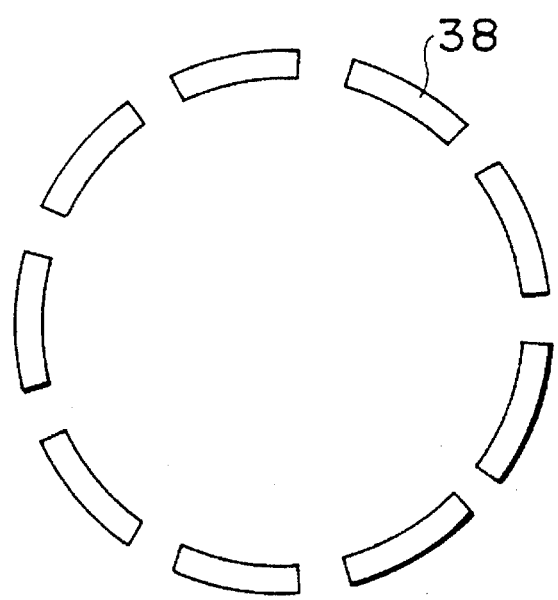
FIGS. 10A and 10B are diagrams illustrating a process for fabricating the armature core used in the first embodiment of the present invention.
Figure 10B:
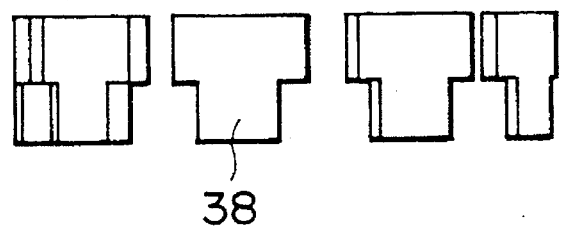

As shown in FIGS. 10A and 10B, the core assembly 36 can be produced by an insert molding process, in which the core pieces 38 are arranged at equal intervals in a mold, and synthetic resin is injected into the mold. Since the core assembly 36 is an integrated member comprised of the nine core pieces 38 and the ring member 39 made of synthetic resin, it is easy to attach the core assembly 36 to the chassis base 21a at one time, as compared with a process for separately attaching the core pieces to the chassis base one by one.

The lower portion 38b of each of the core pieces 38 has a cross-sectional area, which is minimized in order to shorten the length of one turn of the windings 42, reduce the electrical resistance of the windings 42 and improve the driving efficiency of the motor 23. Further, it is not necessary to directly wind a wire around the cores, and hence a normal winding process can be employed. Hence, an increased number of turns of windings can be achieved. It is also possible to use a winding process for forming printed windings rather than the normal winding process.

Figure 11A:
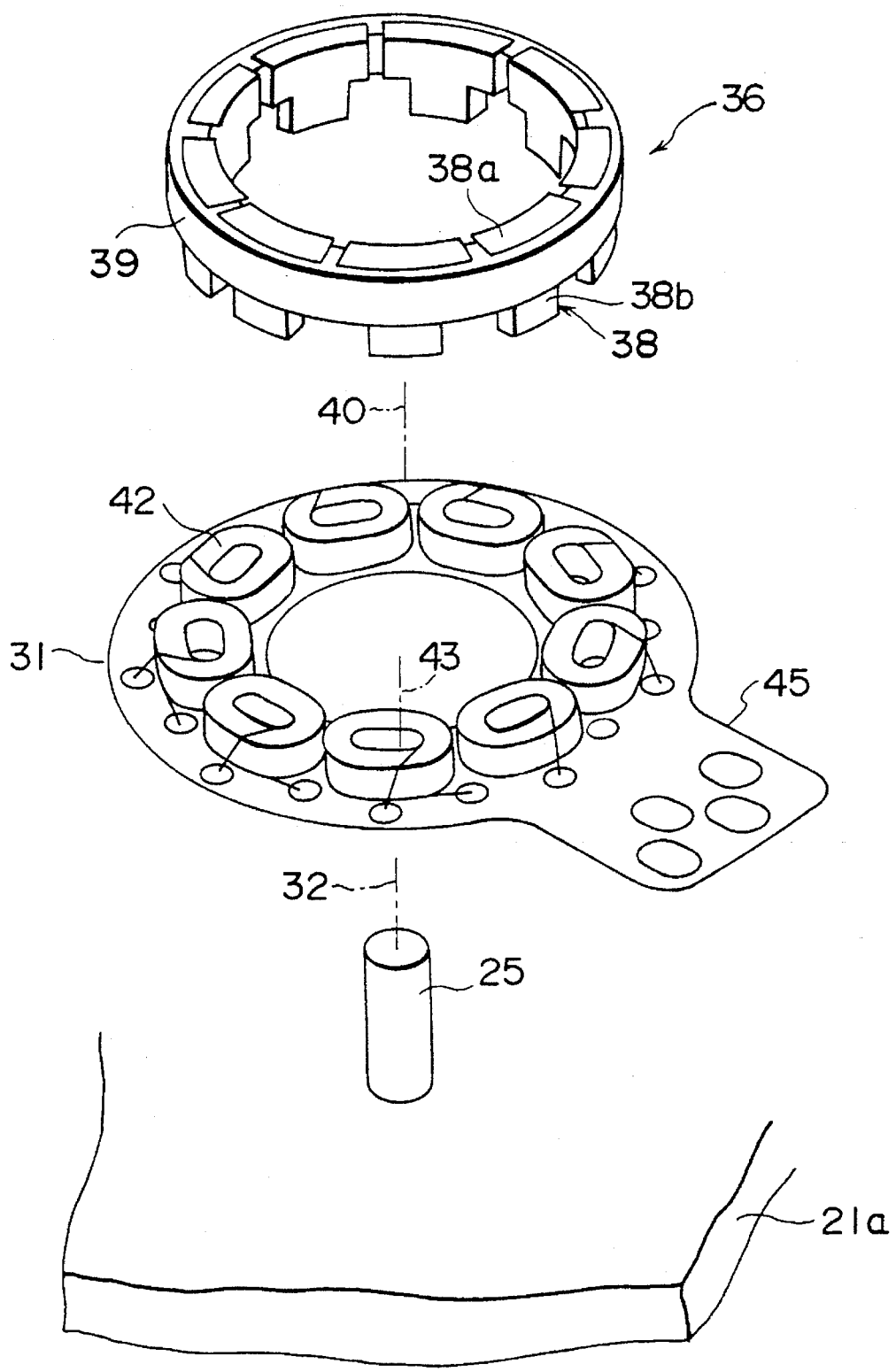
FIG. 11A is an exploded perspective view of a stator of the first embodiment of the present invention.

As shown in FIGS. 4, 5, 11A and 11B, a flexible printed circuit board 45 is mounted on the chassis base 21a. As shown in FIG. 11B, a circuit pattern 45a connecting the windings 42 to each other is formed on the flexible printed circuit board 45. Further, the flexible printed circuit board 45 has openings 45b into which the lower portions 38b are inserted. As shown in FIGS. 5 and 11A, the windings 42 are arranged side by side on the flexible printed circuit board 45 in the circular direction. The windings 42 have respective axes 43, which coincide with the axes 40 of the core pieces 38.

Figure 12:
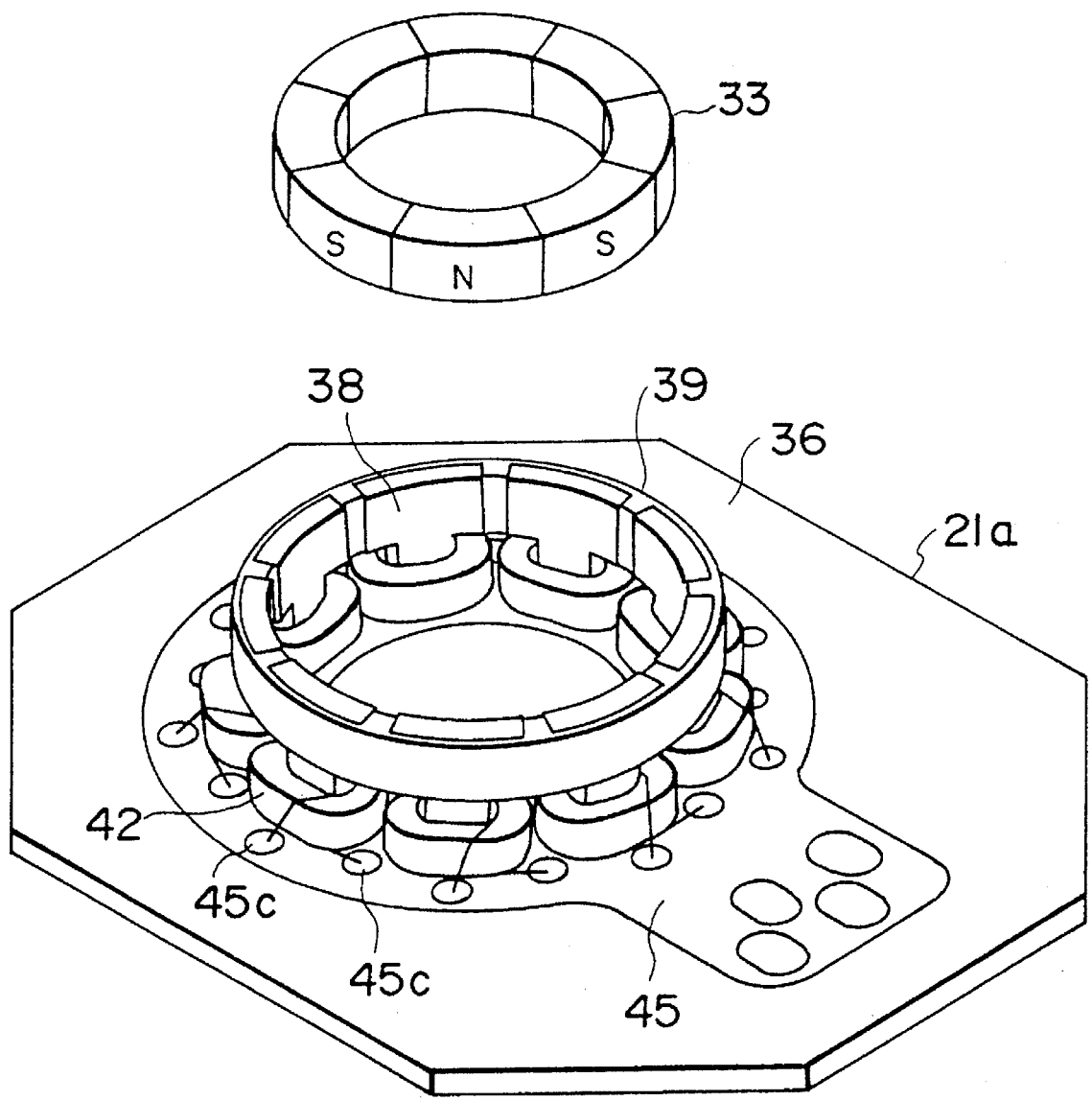
FIG. 12 is a perspective view of the assembled stator.

As shown in FIG. 11A, the lower portions 38b of the core pieces 38 of the core assembly 36 are mounted on the chassis base 21a of the enclosure 21 via the openings 45b (FIG. 11B) formed in the flexible printed circuit board 45, and are thus fixed to the chassis base 21a by means of an adhesive. It is also possible to use a spot welding process for fixing the lower portions 38b to the chassis base 21a. The two ends of each of the windings 42 are connected to terminals 45c of the circuit pattern formed on the flexible printed circuit board 45 by soldering. The chassis base 21a is formed by a drawing process in which an iron plate with a thickness of 0.5 mm is drawn. As has been described previously, the chassis base 21a functions as the stator yoke of the motor 23. As shown in FIG. 12, the windings 42 are respectively located around the lower portions 38b of the core pieces 38.

As shown in FIG. 5, the windings 42 are located just below the ring-shaped recess portion 28 of the hub 24 and are accommodated in a space 44 between the hub 24 and the chassis base 21a. The ring-shaped permanent magnet 33 and the core assembly 36 are located so as to be further out than the outer peripheral walls of the bearings 26 and 27 and be further in than an inner circular edge 22a of the disk 22.

When a current flows in the windings 42, the upper portions 38a of the core pieces 38 are magnetized so that these portions have a magnetic pole based on the direction of the flow of the current. Hence, a rotation force for rotating the ring-shaped permanent magnet 33 is generated.

The spindle motor 23 according to the first embodiment of the present invention has the following advantages. First, the axes 40 and 43 are parallel to the rotation axis 32, and hence a diameter D2 of the motor 23 shown in FIG. 5 can be reduced to, for example, 14 mm. Thus, it is possible to vertically arrange the bearings 26 and 27 side by side even when the motor 23 is used to drive 1.89-inch disks. The motor 23 is of the axial-gap type, and hence a magnetic pull occur in the radial direction of the motor and are canceled by each other. Hence, the bearings 26 and 27 do not have a load due to the magnetic pull. Thus, the spindle motor 23 has a longer lifetime and more stable rotation than the axial-gap type motor.

Second, the upper portions 38a of the core pieces 38 are accommodated in the space 29 in the ring-shaped recess portion 28 of the hub 24, and hence the height H1 of the disk drive 20 can be reduced. The height H1 is approximately equal to the thickness of the IC memory card and is, for example, 5 mm.

Third, the chassis base 21a of the enclosure 21 functions as the yoke of the stator 31, and hence the height H1 of the disk drive 20 can be reduced.

The spindle motor 23 according to the first embodiment of the present invention can use the following alternative parts. The core pieces 38 can be replaced by pieces 38 made of Permendur having a high saturated magnetic flux. Use of Permendur contributes to reducing the cross-sectional areas of the pieces 38 and increasing the number of turns of the windings 42. A desirable shape made of Permendur can be easily obtained by a metal injection mold. Hence, as will be described later, a core piece shown in FIG. 36 can be easily formed integrally. Similarly, permalloy, particularly, PB permalloy defined in the Japanese Industrial Standard has good characteristics due to a high permeability μ and a high saturation magnetic flux density Bs.

Figure 11C:
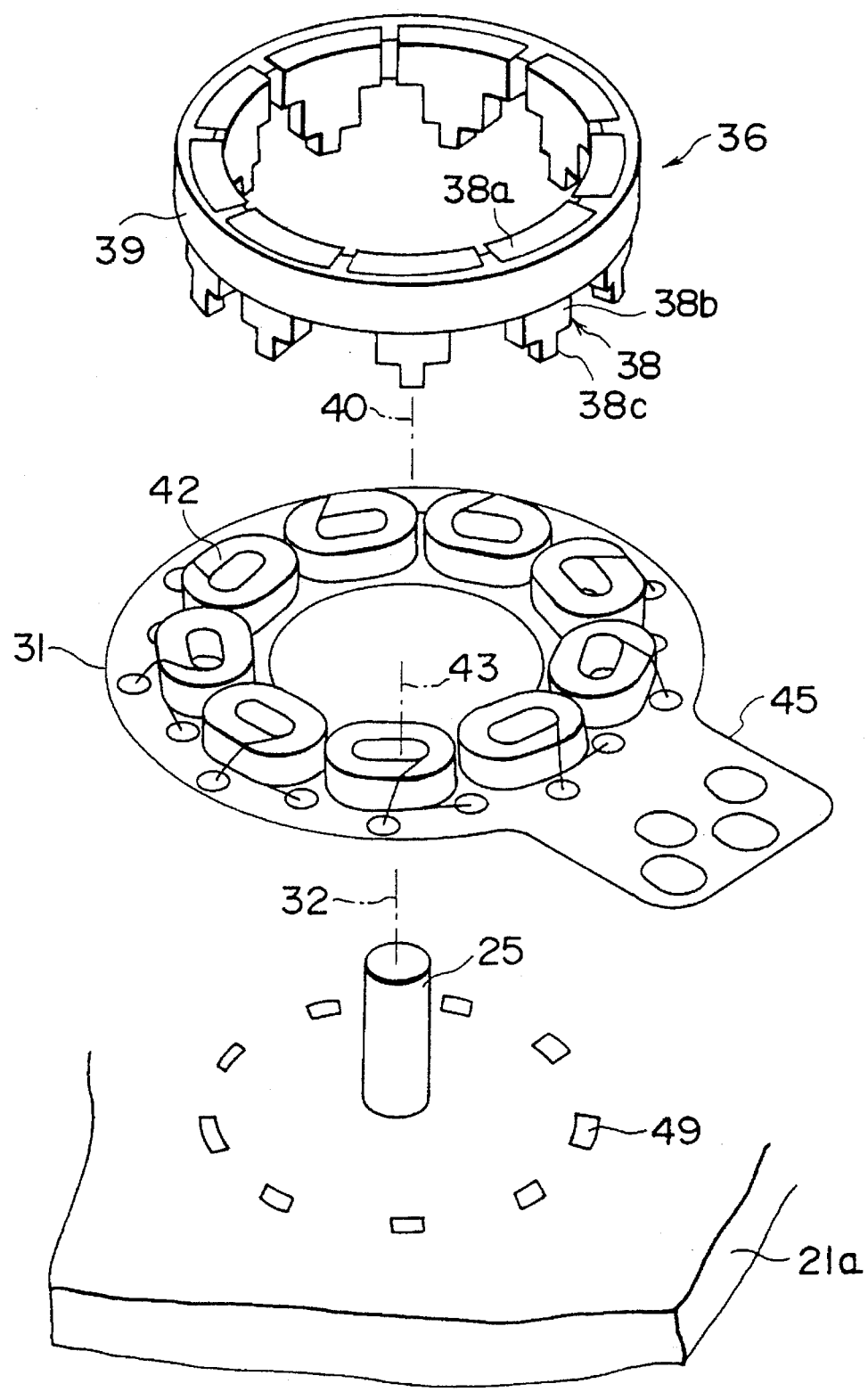
FIG. 11C is a perspective view of a variation of the first embodiment of the present invention.

FIG. 11C shows a variation of the spindle motor according to the first embodiment of the present invention. As shown in FIG. 11C, the core pieces 38 have projections 38c, which are inserted into holes formed in the chassis base 21a or stator yoke. It is also possible for some core pieces 38 to have such projections 38c.

Figure 13:
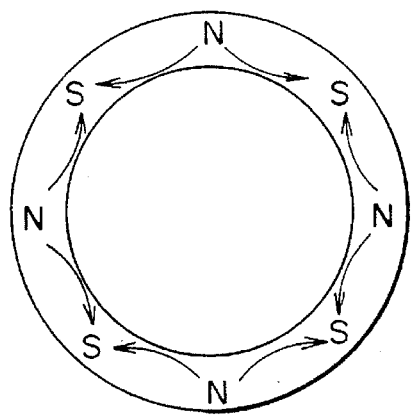
FIG. 13 is a plan view of an alternative permanent magnet used in the first embodiment of the present invention.

It is also possible to use a ring-shaped permanent magnet 33A shown in FIG. 13 instead of the previously described ring-shaped permanent magnet 33. The permanent magnet 33A is a pole-anisotropic magnet multipolarized as shown in FIG. 13. In this case, the hub 24 may be made of a non-magnetic material, such as aluminum, and the permanent magnet 33A can be directly attached to the hub 24 without a yoke. By using the hub 24 made of a non-magnetic material, it is possible to prevent a magnetic shortcircuit in which a magnetic flux is transferred from the permanent magnet 33A to the ring-shaped recess portion 28 or from the first portions 38a to the hub 24.

A description will be given of variations of the core assembly 36.

Figure 14A:
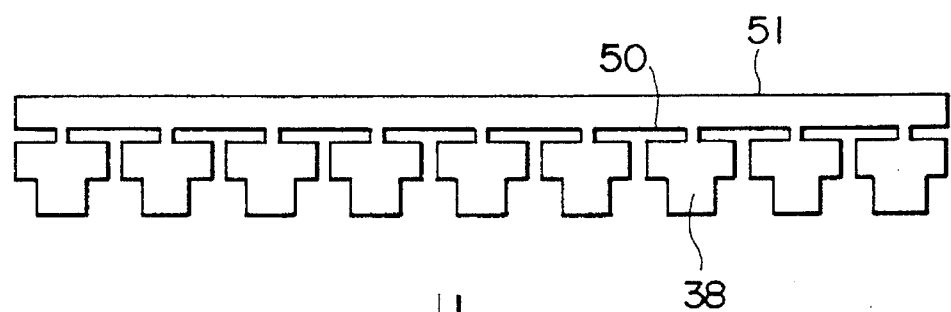
FIGS. 14A and 14B are diagrams illustrating a second process for fabricating the armature core used in the first embodiment of the present invention.
Figure 14B:
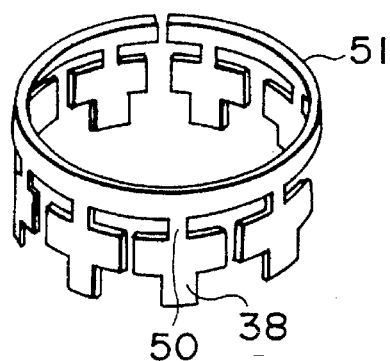

The core assembly 36 can be produced, as shown in FIGS. 14A and 14B. The core assembly 52 can be produced as follows. A magnetic belt member is processed by a press, wire-EDM (Electrical Discharge Machining) of etching process so that the nine cope pieces 38 are connected to a belt portion 51 via bridge portions 50. Then, a processed belt member 52 shown in FIG. 14A is shaped in a circle, as shown in FIG. 14B, and is placed in a mold. Thereafter, the insert molding process is carried out, and then the bridge portions 50 are cut. According to the above production process, it is possible to mope precisely produce the cope assembly 52 than the cope assembly 36 produced by placing the cope pieces 38 in the mold.

Figure 15A:
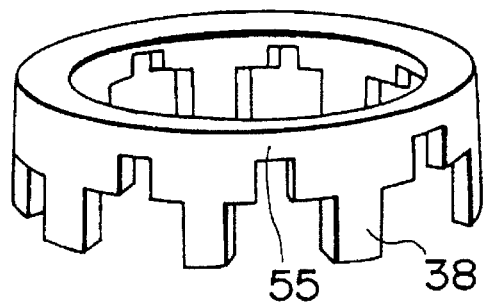
FIGS. 15A, 15B and 15C are diagrams illustrating a third process for fabricating the armature core used in the first embodiment of the present invention.
Figure 15B:
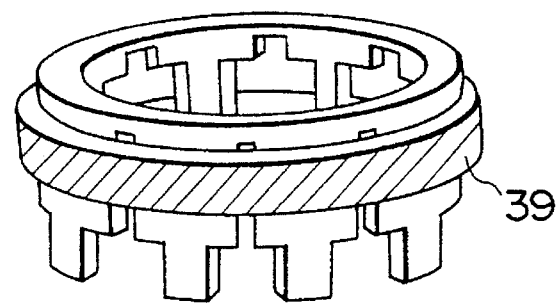
Figure 15C:
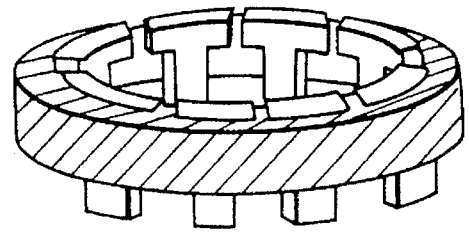

It is also possible to produce the cope assembly 36, as shown in FIGS. 15A, 15B and 15C. First, as shown in FIG. 15A, a cylindrical body 56 of the cope assembly 36 is produced by the metal injection mold and the subsequent sintering process. The cylindrical body 56 has the pieces 38 connected together by means of a bridge portion 58. Next, the body 56 is placed in a mold, and the insert molding process is carried out. Hence, the Ping member 39 made of synthetic resin is formed around the cylindrical body 56. Then, as shown in FIG. 15C, the bridge portion 55 is cut off. According to the process shown in FIGS. 15A–15C, it is possible to mope efficiently produce the cope assembly 36 than as in the process shown in FIGS. 14A and 14B.

Figure 16A:
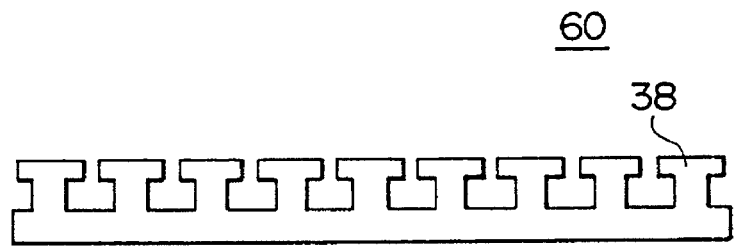
FIGS. 16A, 16B and 16C are diagrams illustrating a third process for fabricating the armature core used in the first embodiment of the present invention.
Figure 16B:
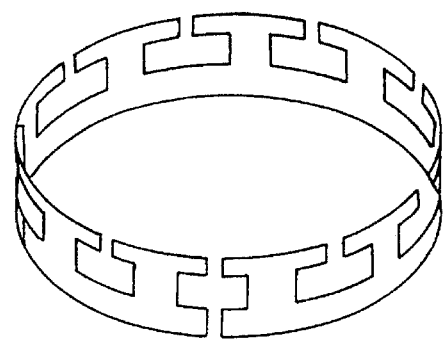
Figure 16C:
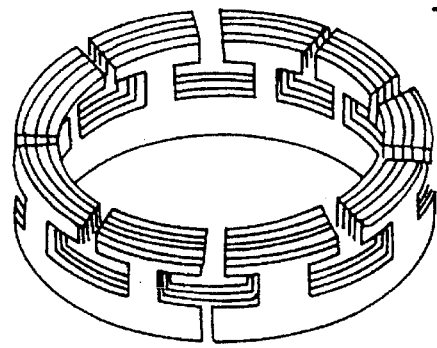

As shown in FIGS. 16A–16C, it is also possible to produce a cope assembly 36A and use it instead of the core assembly 36. As shown in FIG. 16A, a tape-shaped thin plate 60 having the pieces 38 is shaped into a circular member 61, as shown in FIGS. 16A and 16B. A plurality of circular members each being almost the same as the member 61 are produced. The lengths of the circular members used fop forming one core assembly 36A are slightly different from each other. Then, as shown in FIG. 16C, the circular members 51 are attached together by means of an adhesive, so that the core assembly 36A is produced. The circular members 61 are separated from each other by the adhesive, and hence the core assembly 36A has a small eddy current loss.

Instead of the flexible printed circuit board 45, a metal base board can be used in which patterns are directly formed on the chassis base 31a. It is also possible to employ a stator yoke to which the core assembly 36 is directly fixed.

Figure 17:
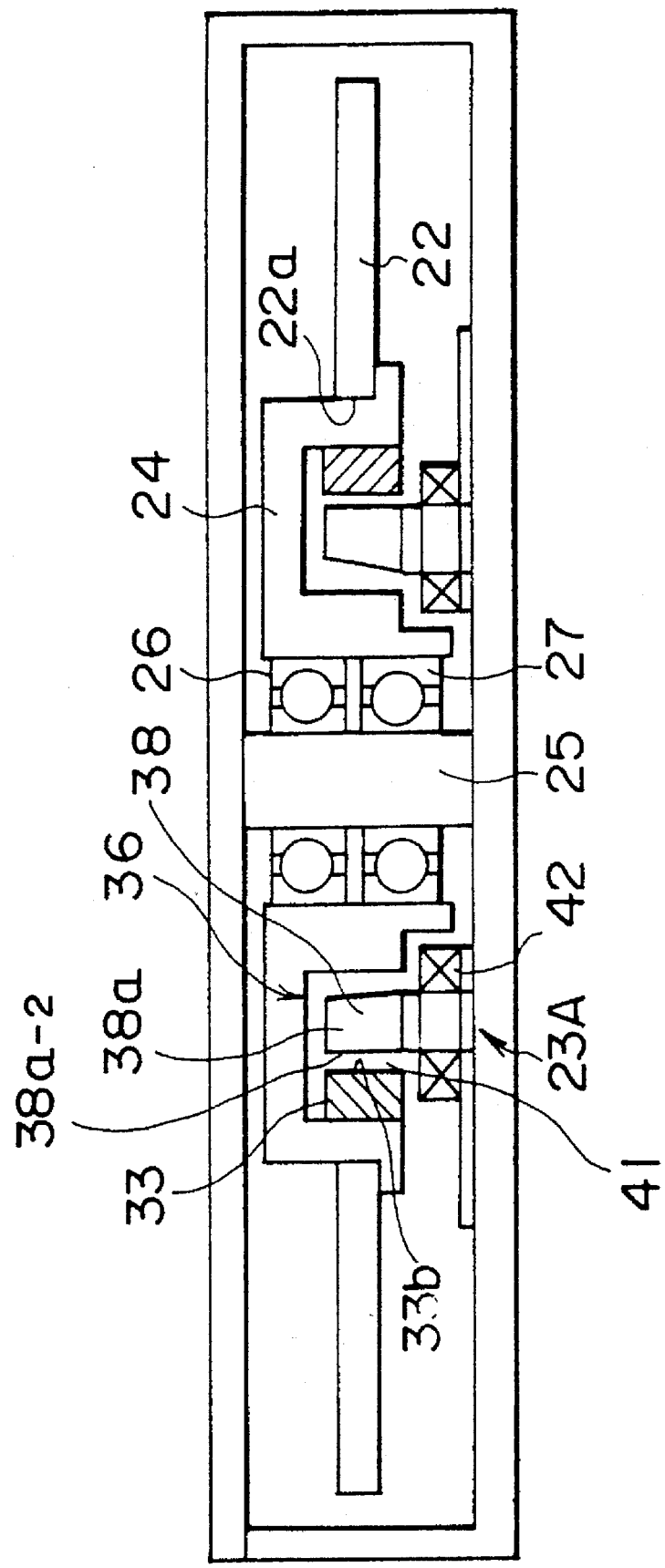
FIG. 17 is a cross-sectional view of a disk drive according to a second embodiment of the present invention.

A description will now be given of a second embodiment of the present invention with reference to FIG. 17 in which parts that are the same as those shown in the previously described figures are given the same reference numbers. A spindle motor 23A according to the second embodiment of the present invention is of a radial-gap, outer rotor type in which the ring-shaped permanent magnet 33 is further out than the core assembly 36 with respect to the axis of the motor.

Outer surfaces 38a-1 of the upper portions 38a face the inner surface 33b of the ring-shaped permanent magnet 33 via the radial gaps 41. With respect to the axis of the motor 23A, the core assembly 36 and the ring-shaped permanent magnet 33 are further out than the outer ends of the bearings 26 and 27, and are further in than the inner circular edge 22a of the disk 22.

Figure 18:
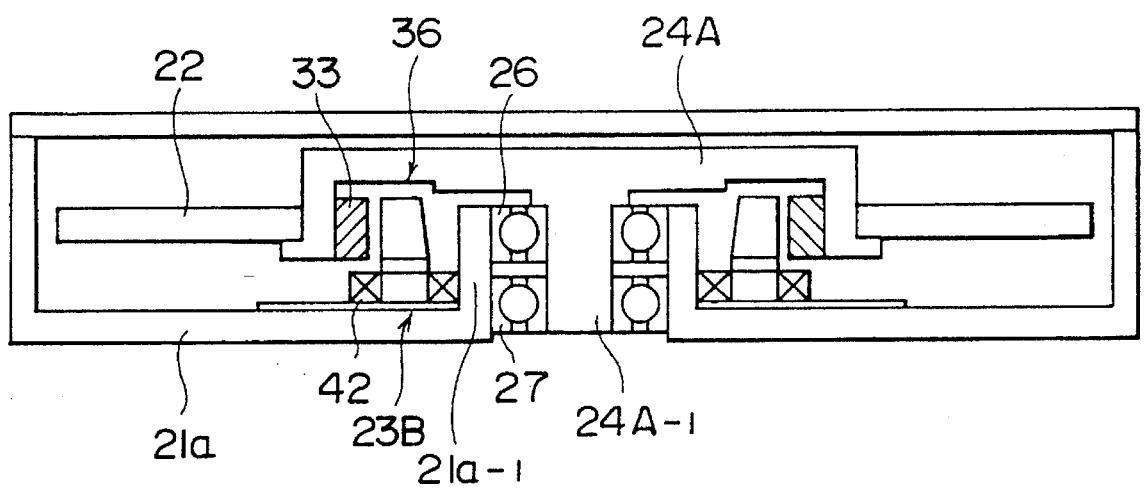
FIG. 18 is a cross-sectional view of a disk drive according to a third embodiment of the present invention.

FIG. 18 shows a spindle motor according to a third embodiment of the present invention. In FIG. 18, parts that are the same as parts shown in the previously described figures are given the same reference numbers. In the first and second embodiments of the present invention, the hub 24 rotates about the stationary shaft 25. In the third embodiment of the present invention, a rotation shaft 24A-1 of a hub 24A of a spindle motor 23B shown in FIG. 18 is rotatably supported by the chassis base 21a by means of the bearings 26 and 27 attached to a hollow cylindrical portion 21a-1. The ring-shaped permanent magnet 33 is further out than the core assembly 36 with respect to the axis of the motor 23B. It is also possible to place the ring-shaped permanent magnet 33 so as to be further in than the core assembly 36 in the same manner as shown in FIG. 5.

A description will now be given of a fourth embodiment of the present invention, which is directed to improve the stator of the first embodiment of the present invention.

Figure 19:
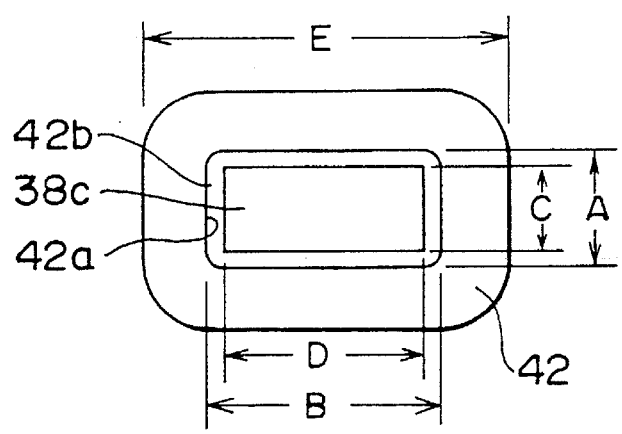
FIG. 19 is a plan view of a coil and a neck portion of the core piece used in the first embodiment of the present invention.
Figure 20:
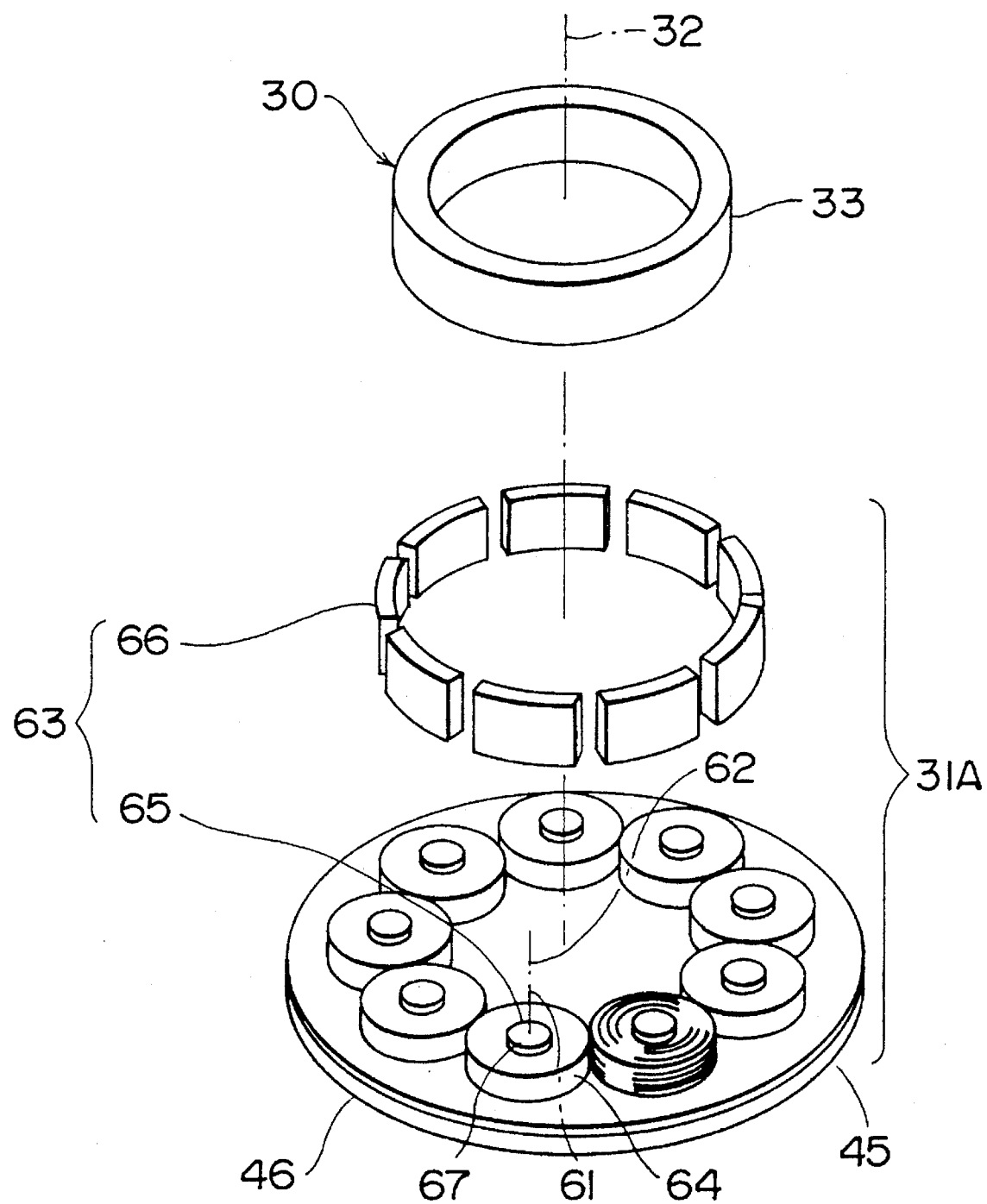
FIG. 20 is an exploded perspective view of a spindle motor according to a fourth embodiment of the present invention.

FIG. 19 is a plan view of one of the windings 42 used in the first to third embodiments of the present invention. The winding 42 has an opening 42a into which the lower portion 38b shown in FIG. 8B is inserted, as shown in FIG. 12. Then, a centering process is carried out so that the position of the core assembly 36 is slightly moved in order to obtain a uniform torque response. Then, the core assembly 36 is fixed at the adjusted position. In order to allow the core assembly 36 to slightly move, it is necessary to form the winding 42 so that the dimensions A and B of the opening 42a are slightly greater than the dimensions C and D of the lower portion 38b. Further, the dimension E of the winding 42 is limited because the windings 42 are circularly arranged so as to be close to each other, as shown in FIG. 12. Hence, the number of turns of each winding 42 is reduced by an amount corresponding to a gap 42b (FIG. 19) between the opening 42a and the lower portion 38b. The fourth embodiment of the present invention is intended to provide an increased number of turns of each winding.

A detailed description will now be given, with reference to FIGS. 20 through 23, of the fourth embodiment of the present invention. In these figures, parts that are the same as parts shown in the previously described figures are given the same reference numbers.

A stator 31A of a motor 23c according to the fourth embodiment of the present invention includes first arch-shaped core members 66 and second columnar core members 65. The first core members 66 are attached on upper ends 67 of the second core members 65 by an adhesive or welding. It is also possible to mold the first and second core members 67 and 66 by synthetic resin. As will be described later, the first and second core members may be integrally made of Permendur or permalloy. The second members 65 are mounted on a stator yoke 46 mounted on the flexible printed circuit board 45 so that lower ends 76 of the second member 65 are in contact with the stator yoke 46 via holes formed in the printed circuit board 45. It is also possible to directly mount the second members 65 on the chassis base 21a made of a magnetic material without using the stator yoke 46. It is possible to reduce the bottom (lower) surface of the stator yoke 46 and the top surface of the first portions 66 or the permanent magnet 33 to 4 mm or less.

Figure 21:
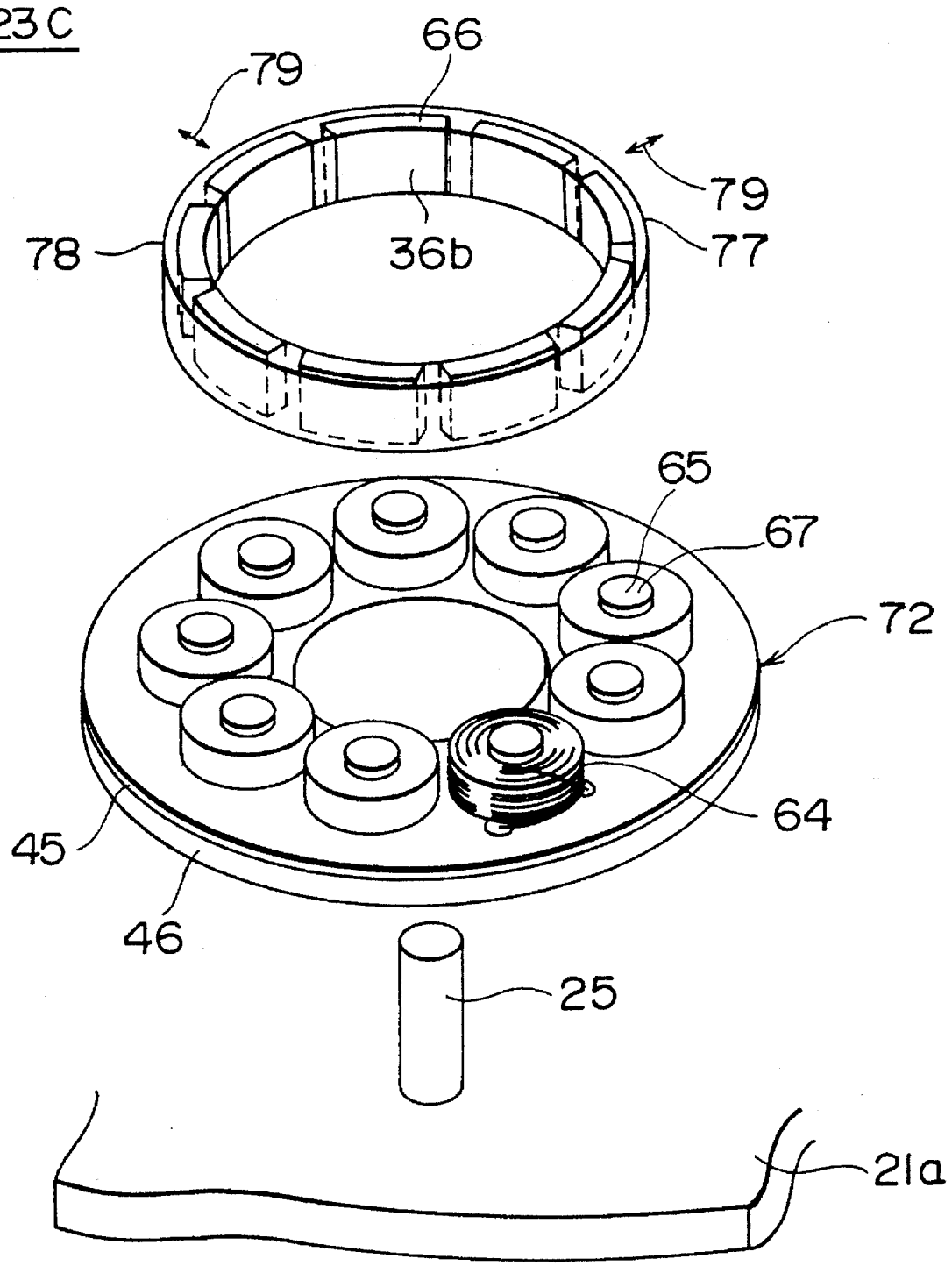
FIG. 21 is another exploded perspective view of the spindle motor according to the fourth embodiment of the present invention.
Figure 22:
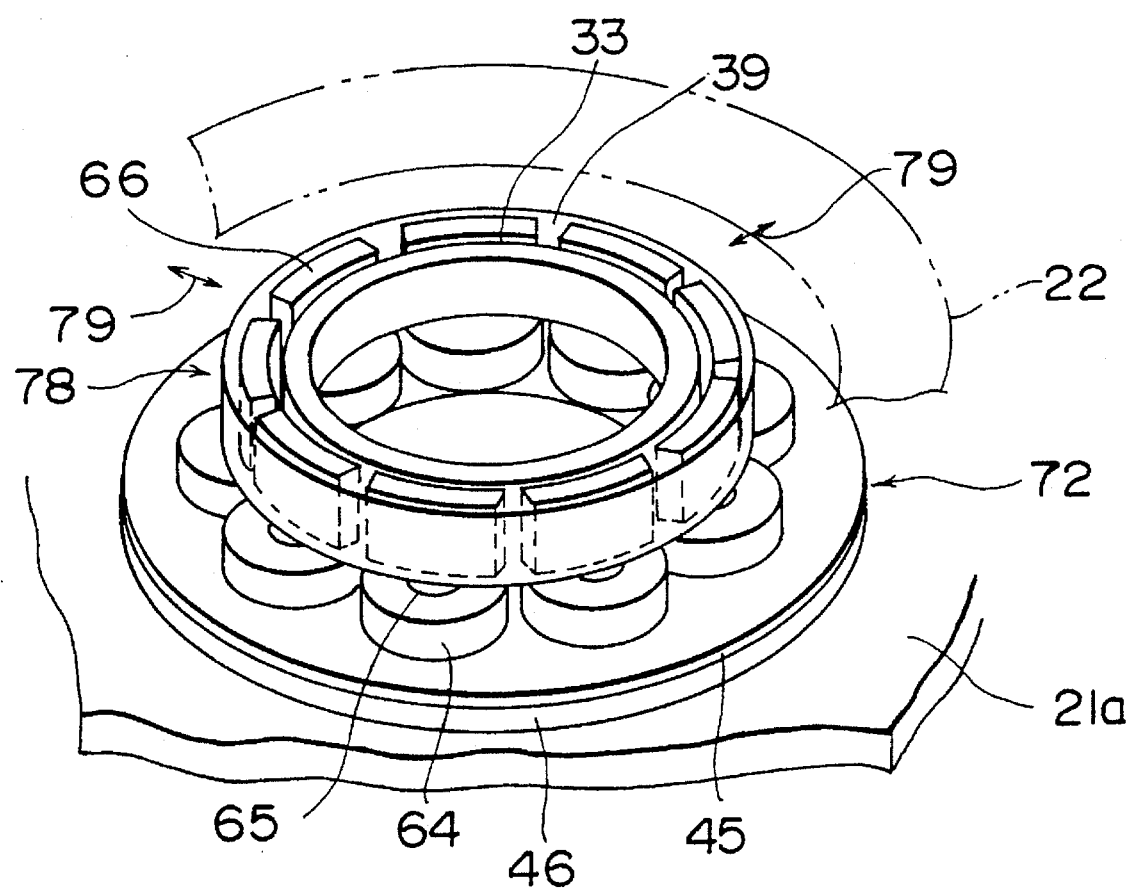
FIG. 22 is a perspective view of the disk motor according to the fourth embodiment of the present invention.
Figure 23:
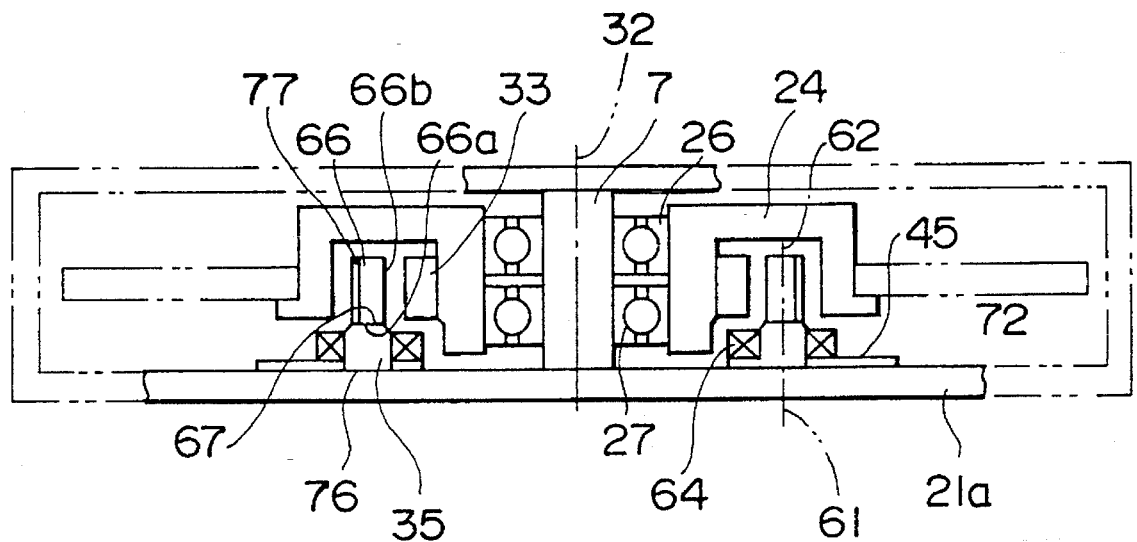
FIG. 23 is a cross-sectional view of a disk drive using the spindle motor according to the fourth embodiment of the present invention.

Windings 64 are respectively wound around the second core members 65, and are electrically connected to each other via a circuit pattern formed on the flexible printed circuit board 45. A one-dot chained line 61 indicates the axis of the windings 64. As shown in FIG. 21, a first assembly 72 includes the second core members 65, the windings 64 and the flexible printed circuit board 45. The first assembly 72 is mounted on the chassis base 21a, which functions as the stator yoke.

A second assembly 78 includes the first core members 66 and a ring member 77 made of synthetic resin. The first members 66 are circularly arranged at equal intervals and are embedded in the ring member 77 so that at least the lower ends of the first members 66 are exposed. The ring-shaped permanent magnet 33 is located inside the second assembly 78. It will be noted that the first core members 66 do not have projecting members projecting from the ring member 77. Hence, it is easy to precisely produce the second assembly 78, as compared to the core assembly 36 shown in FIG. 8B.

Figure 24:
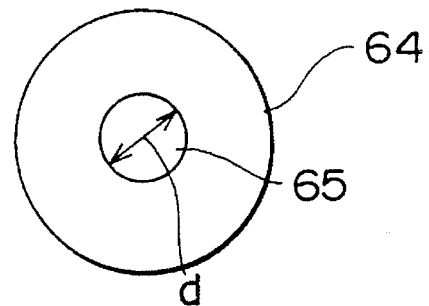
FIG. 24 is a plan view of a winding used in the fourth embodiment of the present invention.

As shown in FIG. 24, there is no gap between the winding 64 and the second core member 65. Hence, an increased number of turns of the winding 64 can be wound. As will be described later, the second core members 65 are not needed to perform the centering adjustment. The diameter d of the second core member 65 is minimized within a range in which the magnetic flux is not saturated. This also contributes to decreasing the electrical resistance of the windings 64.

The centering process is carried out in the state in which the first core members 66 are placed on the upper ends 67 of the second core members 65. The centering process can be carried out by using an appropriate adjustment member, which approximately locates the second assembly 78 with respect to the shaft 25 by moving the assembly 78 in the directions indicated by arrows 79 shown in FIGS. 21 and 22.

Figure 25A:
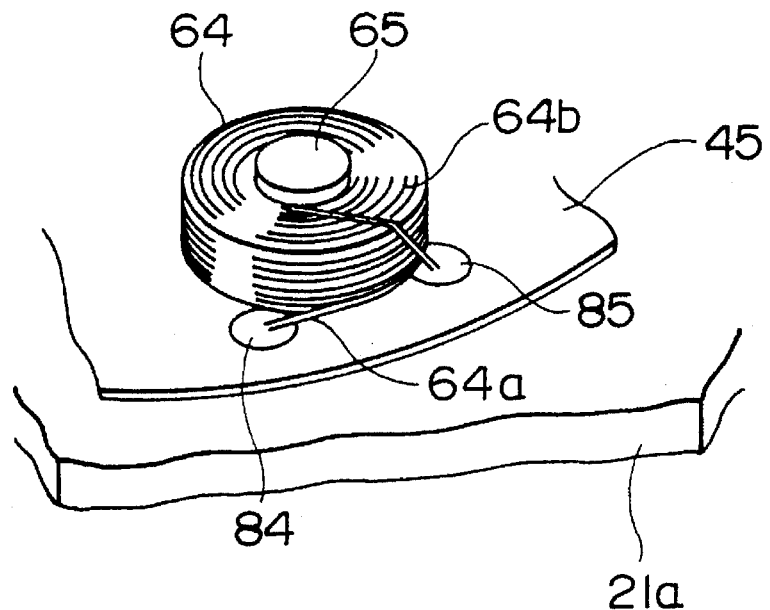
FIGS. 25A and 25B are diagrams showing how a winding is electrically connected to a pattern formed on the flexible printed circuit board.
Figure 25B:
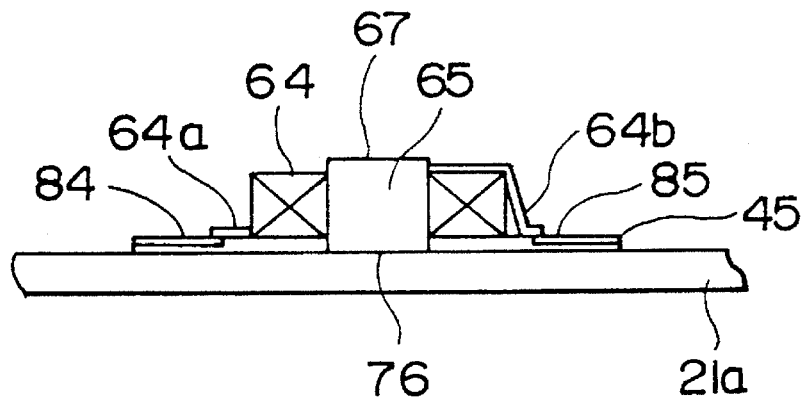

As shown in FIGS. 25A and 25B, two ends of each of the windings 64 are connected to terminals 84 and 85 of the pattern formed on the flexible printed circuit board 45 by soldering. More specifically, a turn ending portion 64a of the winding 64 is connected to the terminal 84 by soldering, and a turn starting portion 64b thereof extends out of the inside of the winding 64 and is connected to the terminal 85 by soldering. The lower end 76 of the second core member 65 is in contact with and fixed to the chassis base 21a functioning as the stator yoke by means of an adhesive or spot welding. When a current flows in the windings 64, a magnetic pole depending on the direction of the flow of the current is generated at the first core members 66, and a rotation force for rotating the permanent magnet 33 is generated.

Figure 26A:
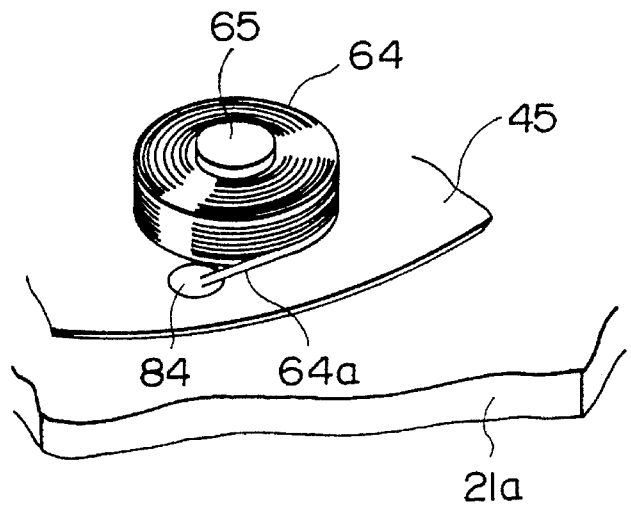
FIGS. 26A and 26B are diagrams illustrating a variation of the structure shown in FIGS. 25A and 25B.
Figure 26B:
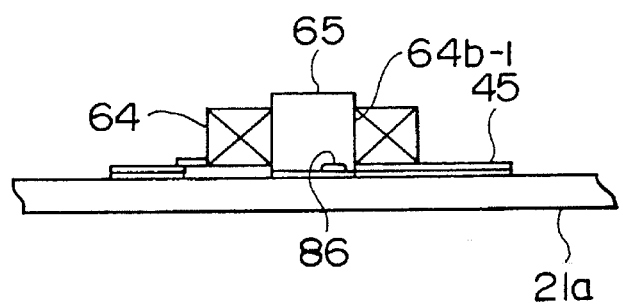

FIGS. 26A and 26B are diagrams showing a first variation of the windings 64. In these figures, parts that are the same as those shown in the previously described figures are given the same reference numbers. A terminal 86 is formed on the flexible printed circuit board 45, and the second core member 65 is in contact with not only the chassis base 21a but also the terminal 86. That is, a part of the flexible printed circuit broad 45 extends below a part of the second core member 65. A turn starting portion 64b-1 of the winding 64 is connected to the second core member 65. According to the variation shown in FIGS. 26A and 26B, it is not necessary to extend the turn starting portion 64b of the winding 64 and hence slightly increase the number of turns of the winding 64.

Figure 27:
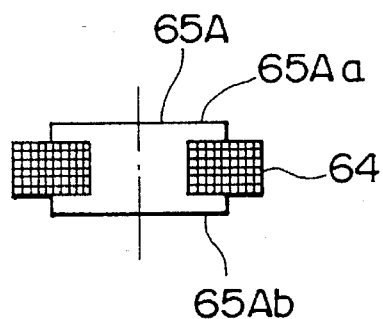
FIG. 27 is a side view of a variation of the winding used in the fourth embodiment of the present invention.

FIG. 27 shows an alternative second core member 65A. The second core member 65A has flange portions 65Aa and 65Ab, and the winding 64 is wound in a recess portion of the second core member 65 formed by the flange portions 65Aa and 65Ab. It becomes possible to stably wind the winding 64.

Figure 28:
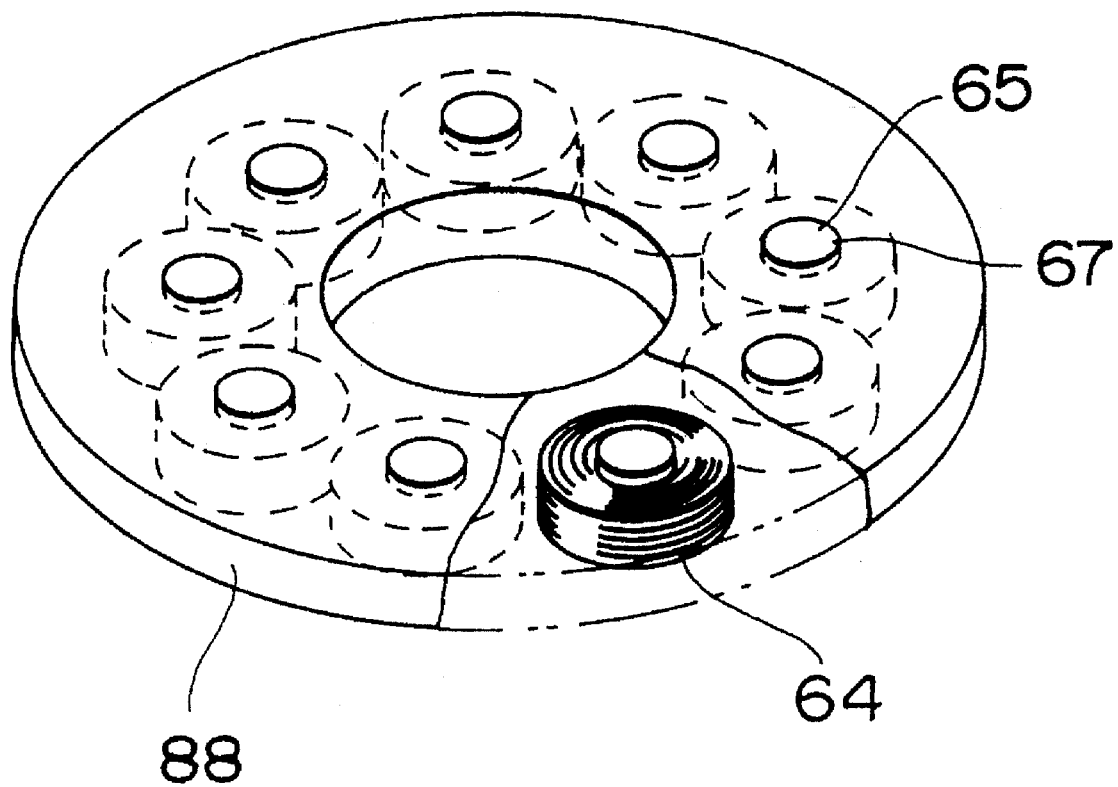
FIG. 28 is a perspective view of a variation of a first assembly used in the fourth embodiment of the present invention.

FIG. 28 shows a first variation 72A of the first assembly 72. The variation 72A, which is of a disk shape, is produced by molding the first assembly 72 by synthetic resin so that the windings 64 are covered by a disk member 88 made of synthetic resin. This structure functions as a labyrinth seal with respect to the bearings 26 and 27. More specifically, the labyrinth seal in which the gaps between the adjacent coils are filled with resin prevents dust such as lubricating grease in the bearings 26 and 27 from being scattered to the magnetic disk 22. The upper ends 67 and the lower ends 76 of the second core members 65 project from the synthetic resin disk. Use of the first assembly 72A facilitates the assembly of the motor.

Figure 29A:
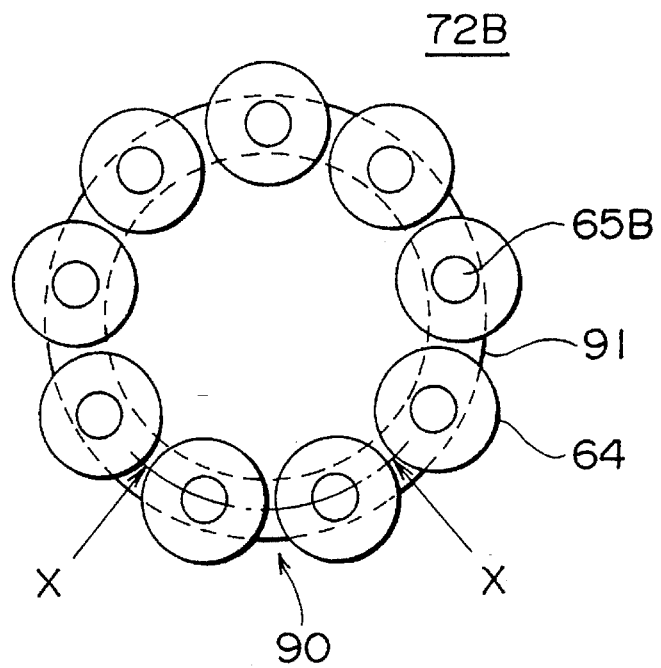
FIGS. 29A and 29B are diagrams of a second variation of the first assembly used in the fourth embodiment of the present invention.
Figure 29B:
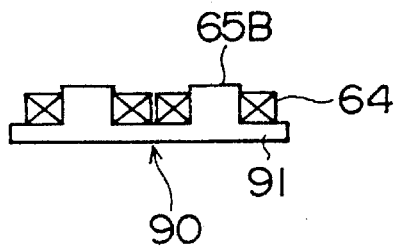

FIGS. 29A and 29B show a second variation 72B of the first assembly 72. The second variation 72B has a hybrid member 90 having a ring-shaped yoke 91, and second core members 65B projecting from the ring-shaped yoke 91. The windings 64 are respectively wound around the second core members 65B. It is possible to precisely locate the second core members 65B and the windings 64. When the second variation 72B is used, the chassis base 21a may be formed of a non-magnetic material.

It is required that the bottom surfaces of the core pieces and the stator yoke or the chassis base have a high flatness and low roughness in order to reduce the spece between these parts and prevent an increase in the magnetic resistance. By using an adhesive having magnetic particles, it is also possible to prevent an increase in the magnetic resistance. The above holds true for each core piece composed of separate members, such as the first and second core members.

Figure 30:
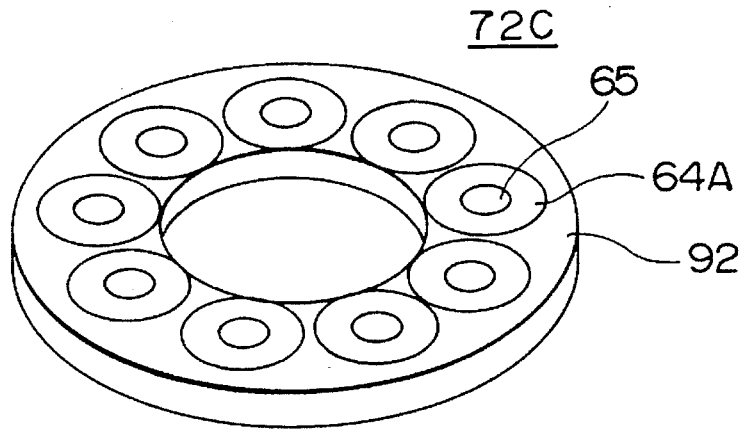
FIG. 30 is a perspective view of a third variation of the first assembly used in the fourth embodiment of the present invention.

FIG. 30 illustrates a third variation 72C of the first assembly 72. Each winding 64A is formed by turning a belt-shaped thin copper film covered by an insulating film a plurality of times. A slice coil marketed in the name of "slice coil" manufactured by Toshiba Home-Techno. can be used as the winding 64A. The windings 64A and the second core members 65 are covered by a ring member 92 made of synthetic resin.

Figure 31A:
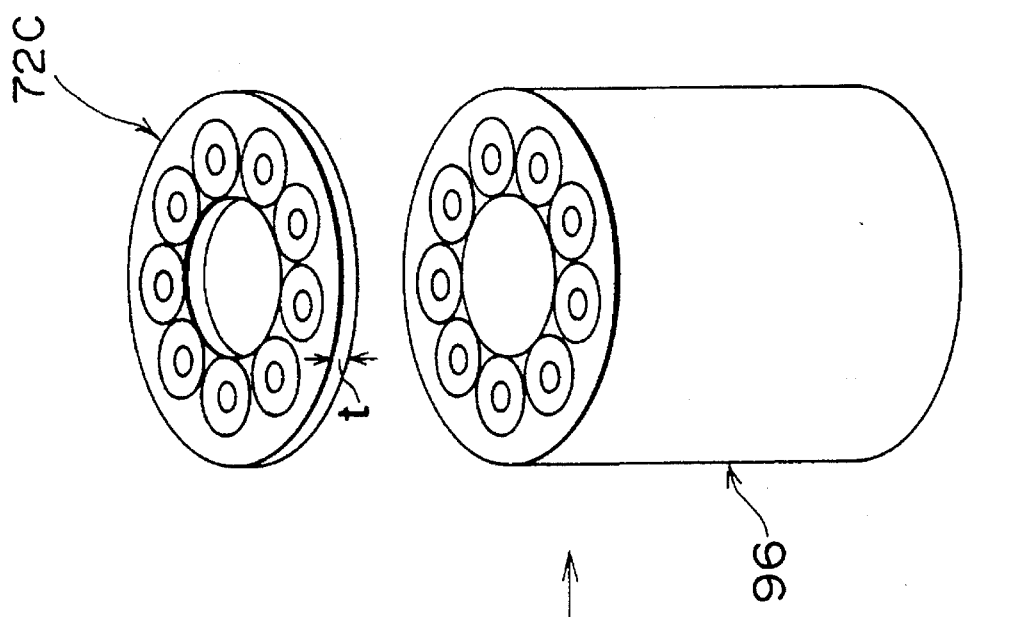
FIGS. 31A, 31B and 31C are diagrams illustrating a process for forming the third variation of the first assembly shown in FIG. 30.
Figure 31B:
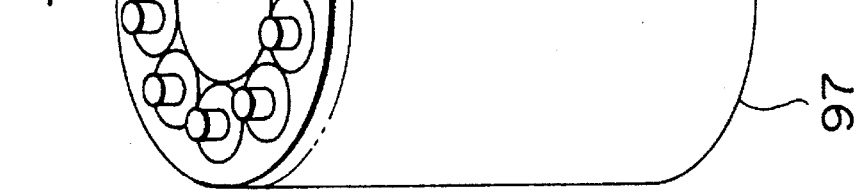
Figure 31C:
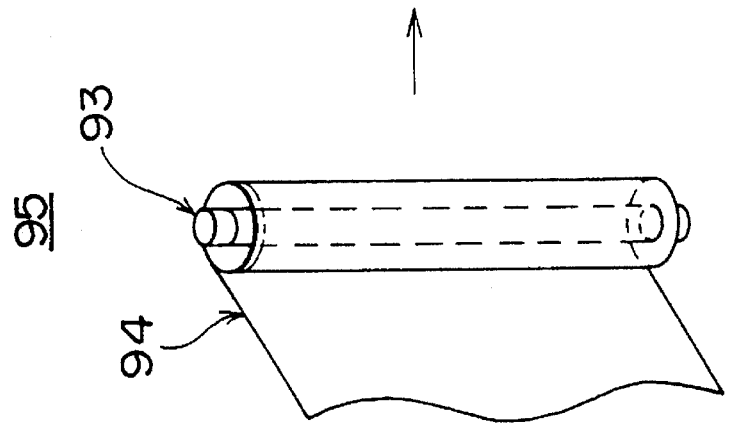

The third variation 72C shown in FIG. 30 can be produced, as shown in FIGS. 31A, 31B and 31C. As shown in FIG. 30A, a belt-shaped thin copper film 94 is turned around a magnetic rod 93 a plurality of times, so that a copper film winding member 95 is formed. Next, as shown in FIG. 31B, nine members 95 are circularly arranged, and a molding process is carried out. Hence, an assembly 96 having a hollow cylindrical member 96 covering the nine members 95 is formed. Then, as shown in FIG. 31C, the assembly 96 is sliced along a two-dot chained line, so that the assembly 72C having a thickness t can be obtained.

According to the production process shown in FIGS. 31A–31C, a plurality of first assemblies 72C having uniform quality can be efficiently produced. When it is desired that a film starting portion of each of the windings 64A is connected to the second core member 65, the insulating film does not cover the film starting portion. It will be noted that the windings 64 and the second core members 65 shown in FIGS. 20–22 can be produced by slicing the member 95 along a two-dot chained line shown in FIG. 31A.

Figure 32:
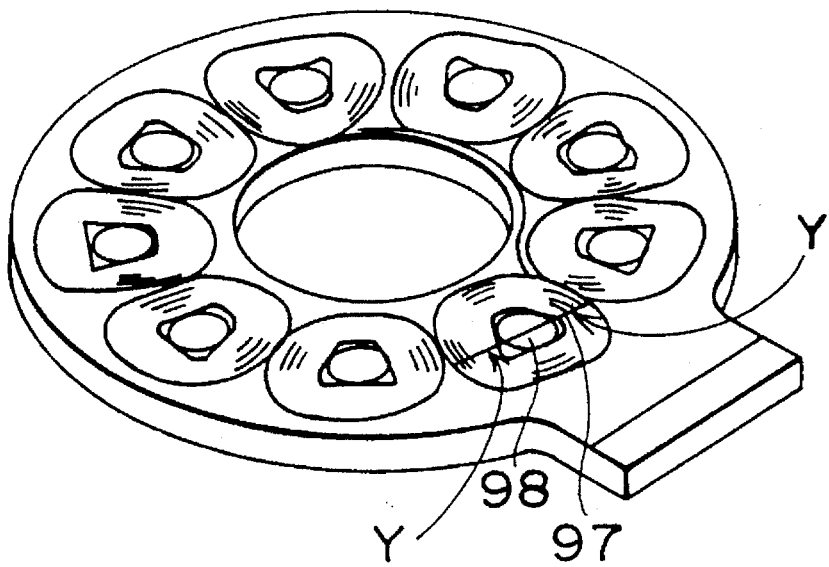
FIGS. 32 and 33 are diagrams of a fourth variation of the first assembly used in the fourth embodiment of the present invention.
Figure 33:
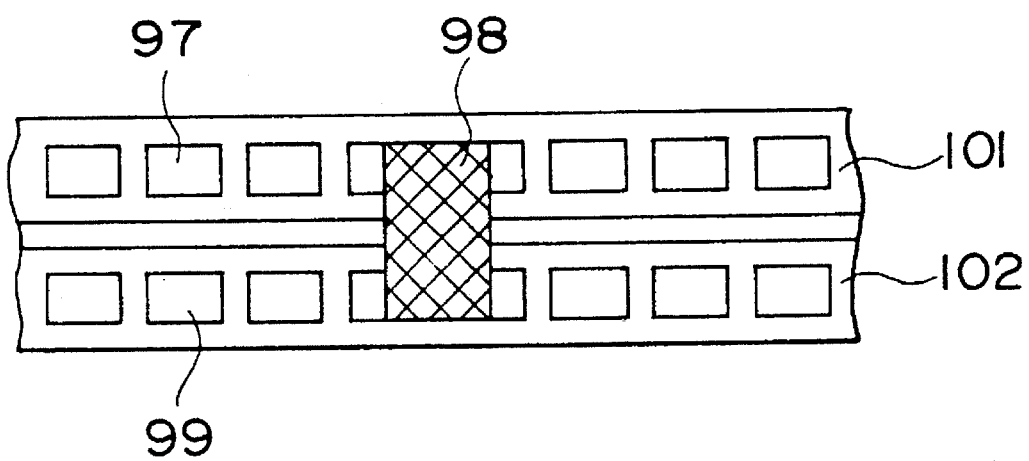

FIGS. 32 and 33 show a fourth variation 72D of the first assembly 72. The fourth variation 72D includes an upper layer 101 and a lower layer 102. The layers 101 and 102 are simultaneously formed by a photographical process. Nine spiral winding patterns 97 made of copper are formed in the upper layer 101 and arranged in a circle. Similarly, nine spiral winding patterns 99 made of copper are formed in the lower layer 102 and arranged in a circle. Windings are formed by a plating or etching process. A through hole penetrating the upper layer 101 and the lower layer 102 is formed by etching. Then, a cylindrical core member 98 is formed in the through hole by filling the through hole with a magnetic material by plating. The core member 98 functions to electrically connect the winding patterns 97 and 99 to each other. The core member 98 may be made of Permendur, permalloy, Sendust, ferro nitride, or ferro silicon. An "FP coil" manufactured by Asahi-kasei has almost the same structure as the variation 72D. It will be noted that the FP coil does not use a magnetic material.

It is possible to stack a plurality of layers each having the structure shown in FIG. 33. In this case, the stacked layers are fixed together by means of an adhesive. Then, a through hole penetrating the stacked layers is formed.

Figure 34:
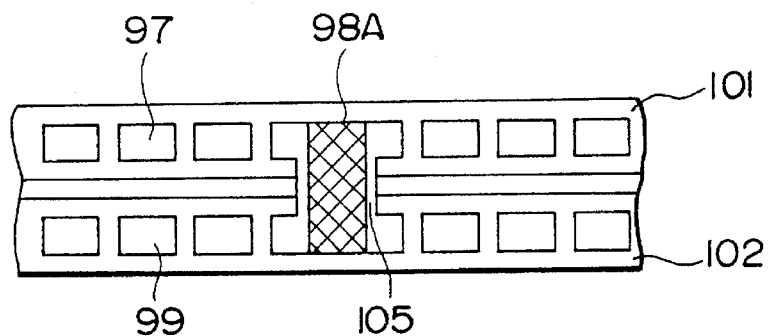
FIG. 34 is a cross-sectional view of a variation of the structure shown in FIGS. 32 and 33.
Figure 35:
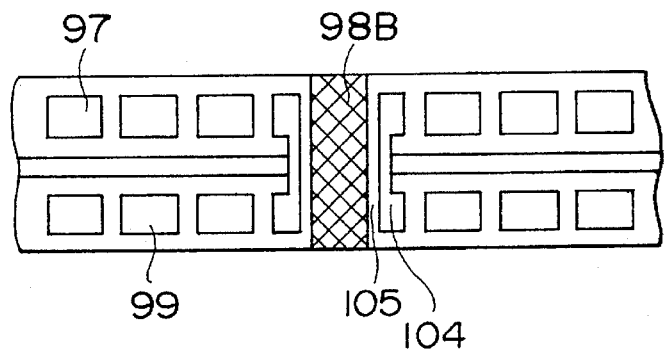
FIG. 35 is a cross-sectional view of another variation of the structure shown in FIGS. 32 and 33.

FIG. 34 shows a first variation of the structure shown in FIG. 33. A core member 98A is provided in a thin through hole 104 covered by copper formed by plating. FIG. 35 shows a second variation of the structure shown in FIG. 33. A core member 98B is provided inside an insulating layer portion 105 formed in the thin through hole 104 covered by copper. The core member 98B is electrically isolated from the winding patterns 97 and 99 by the insulating layer portion 105.

Figure 36:
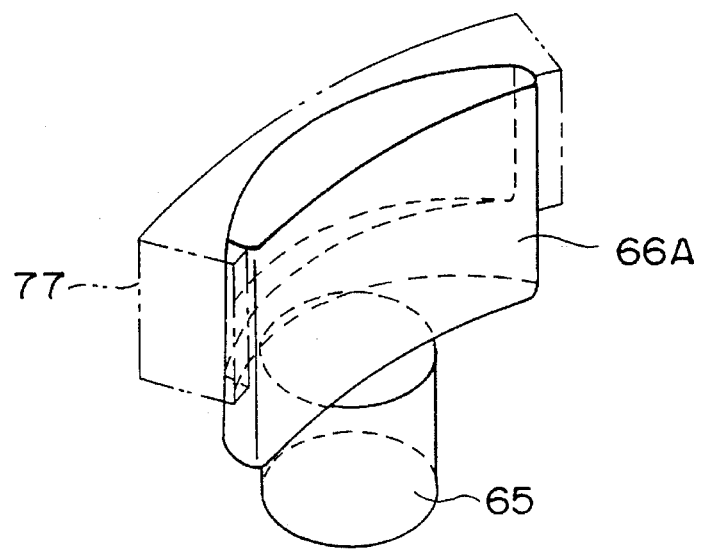
FIG. 36 is a perspective view of a variation of the core piece used in the embodiments of the present invention.

FIG. 36 shows a variation 66A of the first core member 66. The first core member 66 used in the previously described embodiments is formed so that the thickness thereof gradually increases from the upper end to the lower end to which the first core member is attached. The first core member 66A shown in FIG. 36 is formed so that a center portion thereof is thicker than end portions thereof in the circular direction. As has been described previously, the first core member 66A and the second core member 65 can be an integrally formed member made of Permendur or permalloy.

The structures shown in FIGS. 30 and 32 have the aforementioned labyrinth seal structure.

Figure 37:
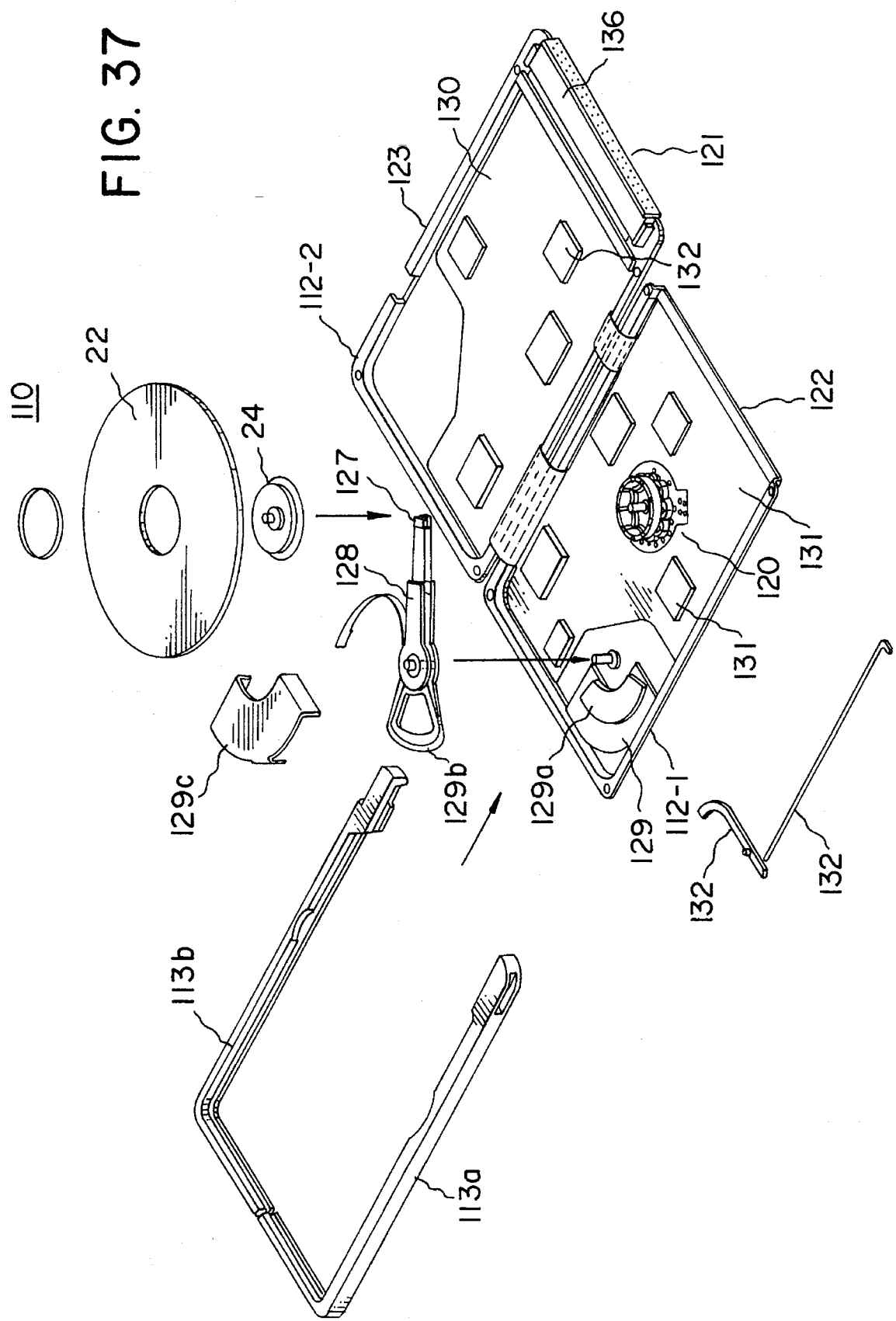
FIG. 37 is a perspective view of a disk drive having the spindle motor according to the present invention.

FIG. 37 shows a disk drive 110 to which the spindle motor according to the present invention is applied. The disk drive 110 shown in FIG. 37 comprises a thin rectangular housing 121 that is constituted by a base 122 and a cover 123 and that has outer dimensions of approximately 85.6 mm×54 mm×5 mm which are the same as an IC memory card of type II of PCMCIA. More concretely, each of the above base 22 and the cover 23 is fabricated by forming a metal plate with a height of 4 to 5 mm by means of drawing into a form of a vessel. Typically, a height of the base 22 is 2 mm, while a thickness of the cover 23 is 3 mm. The steel plate with the thickness of 0.4 to 0.5 mm is formed by means of drawing and the base 22 and the cover 23 each having an opening in one side and each having a vessel form. Accordingly, if the base 22 and the cover 23 are combined together, the total thickness, i.e., a thickness dimension of the rectangular housing 21, becomes 5 mm.

In one of the shorter sides of the rectangular housing 21, a space for fixing a connector 136 is provided. In the other shorter side and two longer sides of the housing 121, coupling flanges 112-1 and 112-2, extend outward at the outer peripheral portion of the above base 122 and cover 123, respectively.

The rectangular housing 121 includes at least one magnetic disk 22, a spindle motor, at least one magnetic head 127, at least one arm 128, an actuator 129, printed circuit boards 130 and 131, and IC chips 132. The spindle motor includes the hub 24 and a stator assembly 120, as has been described previously. The actuator 129 comprises a magnet portion 129a comprised of at least one permanent magnet, a yoke portion 129c located in such a manner that it encloses a permanent magnet, and a movable winding portion 129b located inside the yoke portion 129c.

In the outer peripheral portion of the coupling flanges 112-1 and 112-2, a frame composed of a pair of L-shaped frame elements 113a and 113b is attached in order to force the jointed coupling flanges 112-1 and 112-2 to be closed up tightly. Further, the L-shaped frame elements 113 and 113b are locked by locking elements 132.

Figure 38:
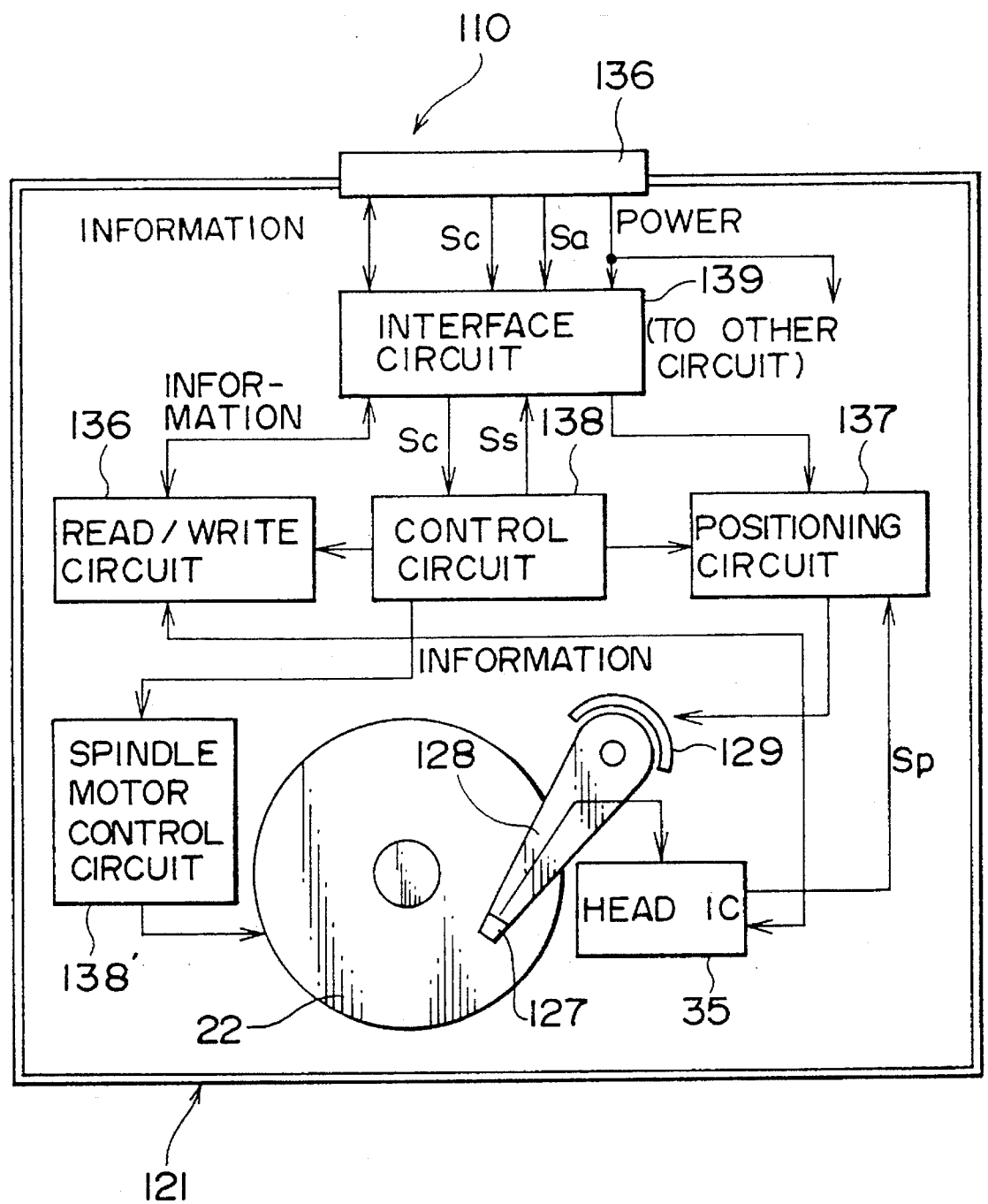
FIG. 38 is a block diagram of an electronic system of the disk drive shown in FIG. 37.

FIG. 38 is a block diagram of an electric system of the disk drive 110. The electric system of the disk drive 110 includes an interface circuit 139 that allows communication with an external host computer, a read/write circuit 136 that receives read signals from the head assembly and provides write signals to the head assembly, a servo circuit that is comprised of a positioning circuit 137 and an amplifying circuit (head IC) 135 to control the operations of the magnetic disk 22 and the head assembly, and a control circuit 138 that receives control signals Sc from the external host computer via the interface circuit 139 and provides the control signals Sc to the read/write circuit 136 and the servo circuit. More specifically, the control signals Sc and address signals Sa are sent from the host computer to the interface circuit 139 via the connector 136. Further, the control signals Sc are input into the control circuit 138, and status signals Ss indicating the current status of the magnetic disk drive 110 are issued from the control circuit 138 to the interface circuit 139. Also, the interface circuit 139 is coupled to the positioning circuit 137, which determines the position of the magnetic head 127 on the magnetic disk 22 in accordance with instructions from the host computer. Here, the information of the above position read by the magnetic head 124 is sent back to the positioning circuit 137 as position signals Sp, via the amplifying circuit 135, so that accurate positioning can be performed by means of servo control Further, power is supplied to all the above circuits via the connector 136, together with any other associated circuits.

The present invention is not limited to the specifically disclosed embodiments, and variations and modifications may be made without departing from the scope of the present invention.

What is claimed is:

1. A spindle motor comprising:

a permanent magnet multipolarized in a circular direction of the permanent magnet, said permanent magnet generating magnetic fluxes in radial directions of the spindle motor;

a core assembly having core pieces, said core pieces respectively comprising first portions that are circularly arranged and face the permanent magnet via a gap, and second portions guiding magnetic fluxes in parallel with a rotation axis of the spindle motor;

windings that are turned around the second portions of the core assembly and have axes of the windings extending in parallel with the rotation axis of the spindle motor; and a yoke magnetically coupling the core pieces with each other wherein each of the first portions has a first end and a second end, the second end facing one of the second portions; and the second end is thicker than the first end.

2. The spindle motor as claimed in claim as claimed in claim 1, wherein each of the second portions comprises a cylindrical member.

3. The spindle motor as claimed in claim 1, wherein:

each of the first portions has a center portion, and first and second ends opposite to each other in the circular direction; and the center portion is thicker than the first and second ends.

4. A spindle motor comprising:

a permanent magnet multipolarized in a circular direction of the permanent magnet, said permanent magnet generating magnetic fluxes in radial directions of the spindle motor;

a core assembly having core pieces, said core pieces respectively comprising first portions that are circularly arranged and face the permanent magnet via a gap, and second portions guiding magnetic fluxes in parallel with a rotation axis of the spindle motor;

windings that are turned around the second portions of the core assembly and have axes of the windings extending in parallel with the rotation axis of the spindle motor; and a yoke magnetically coupling the core pieces with each other, wherein the first portions are members separate from members of the second portions.

5. The spindle motor as claimed in claim 4, wherein the first portions and the second portions are respectively attached to each other by an adhesive.

6. The spindle motor as claimed in claim 4, wherein the first portions and the second portions are respectively attached to each other by welding.

7. The spindle motor as claimed in claim 4, further comprising a resin molding member in which the first portions and the second portions are held so that the first portions and the second portions are respectively in contact with each other.

8. A spindle motor comprising:

a permanent magnet multipolarized in a circular direction of the permanent magnet, said permanent magnet generating magnetic fluxes in radial directions of the spindle motor;

a core assembly having core pieces, said core pieces respectively comprising first portions that are circularly arranged and face the permanent magnet via a gap, and second portions guiding magnetic fluxes in parallel with a rotation axis of the spindle motor;

windings that are turned around the second portions of the core assembly and have axes of the windings extending in parallel with the rotation axis of the spindle motor; and a yoke magnetically coupling the core pieces with each other, wherein the core assembly comprises a ring member that holds the first portions.

9. The spindle motor as claimed in claim 8, wherein said ring member comprises synthetic resin.

10. A spindle motor comprising:

a permanent magnet multipolarized in a circular direction of the permanent magnet, said permanent magnet generating magnetic fluxes in radial directions of the spindle motor;

a core assembly having core pieces, said core pieces respectively comprising first portions that are circularly arranged and face the permanent magnet via a gap, and second portions guiding magnetic fluxes in parallel with a rotation axis of the spindle motor;

windings that are turned around the second portions of the core assembly and have axes of the windings extending in parallel with the rotation axis of the spindle motor; and a yoke magnetically coupling the core pieces with each other, wherein the spindle motor includes a hub having a ring-shaped recess portion having an inner surface and an outer surface, the inner surface being closer to the rotation axis of the spindle motor than the outer surface;

the permanent magnet is accommodated so as to face the first portions of the core assembly in the radial direction; and the first portions of the core assembly are accommodated in the ring-shaped recess portion.

11. The spindle motor as claimed in claim 10, wherein each of the first portions is integrally formed with a corresponding one of the second portions.

12. The spindle motor as claimed in claim 10, wherein:

each of the first portions is integrally formed with a corresponding one of the second portions; and an integrated member comprising one of the first portions and one of the second portions comprises a plurality of thin films stacked.

13. The spindle motor as claimed in claim 10, wherein the first and second portions comprise soft iron.

14. The spindle motor as claimed in claim 10, wherein the first and second portions comprise Permendur.

15. The spindle motor as claimed in claim 10, wherein the first and second portions comprise permalloy.

16. The spindle motor as claimed in claim 10, wherein the first and second portions comprise ferro silicon.

17. The spindle motor as claimed in claim 10, wherein the first and second portions comprise soft ferrite.

18. The spindle motor as claimed in claim 10, wherein the first and second portions comprise resin containing magnetic powders.

19. The spindle motor as claimed in claim 10, further comprising:

a stationary shaft; and bearing means for rotatably supporting the hub to the stationary shaft.

20. The spindle motor as claimed in claim 10, further comprising:
   a rotatably shaft supporting the hub; and
   bearing means for rotatably supporting the rotatably shaft.

21. The spindle motor as claimed in claim 10, wherein:
   the permanent magnet is attached to the inner wall of the ring-shaped recess portion of the hub; and
   the first portions of the core assembly are located so as to be further out than the permanent magnet with respect to the rotation axis of the spindle motor.

22. The spindle motor as claimed in claim 10, wherein:
   the permanent magnet is attached to the outer wall of the ring-shaped recess portion of the hub; and
   the first portions of the core assembly are located so as to be further in than the permanent magnet with respect to the rotation axis of the spindle motor.

23. The spindle motor as claimed in claim 10, wherein the hub comprises a ferromagnetic material.

24. The spindle motor as claimed in claim 10, wherein the yoke is a part of a chassis base of a device in which the spindle motor is provided.

25. The spindle motor as claimed in claim 10, wherein a distance between a lower surface of the stator yoke and either a top of the permanent magnet or tops of the first portions is equal to or less than 4 mm.

26. The spindle motor as claimed in claim 10, wherein a diameter of the spindle motor is equal to or less than 14 mm.

27. The spindle motor as claimed in claim 10, wherein the core pieces are separated from the stator yoke.

28. The spindle motor as claimed in claim 10, wherein the core pieces and the stator yoke are connected to each other by means of an adhesive.

29. The spindle motor as claimed in claim 10, wherein the core pieces and the stator yoke are connected to each other by welding.

30. The spindle motor as claimed in claim 10, wherein the core pieces have portions inserted into holes formed in the stator yoke.

31. The spindle motor as claimed in claim 10, wherein the core pieces and the stator yoke are an integrally formed member.

32. A spindle motor comprising:
   a permanent magnet multipolarized in a circular direction of the permanent magnet, said permanent magnet generating magnetic fluxes in radial directions of the spindle motor;
   a core assembly having core pieces, said core pieces respectively comprising first portions that are circularly arranged and face the permanent magnet via a gap, and second portions guiding magnetic fluxes in parallel with a rotation axis of the spindle motor;
   windings that are turned around the second portions of the core assembly and have axes of the windings extending in parallel with the rotation axis of the spindle motor;
   a yoke magnetically coupling the core pieces with each other; and
   a flexible printed circuit board having a pattern connecting the windings together,
   the flexible printed circuit board being interposed between the core assembly and the stator yoke.

33. The spindle motor as claimed in claim 32, wherein:
   one of two ends of each of the windings is connected to a corresponding one of the second portions connected to a pattern formed on the flexible printed circuit; and
   the other one of the two ends of each of the windings is directly connected to the pattern.

34. The spindle motor as claimed in claim 32, wherein the permanent magnet is a radial-anisotropic magnet multipolarized.

35. A spindle motor comprising:
   a permanent magnet multipolarized in a circular direction of the permanent magnet, said permanent magnet generating magnetic fluxes in radial directions of the spindle motor;
   a core assembly having core pieces, said core pieces respectively comprising first portions that are circularly arranged and face the permanent magnet via a gap, and second portions guiding magnetic fluxes in parallel with a rotation axis of the spindle motor;
   windings that are turned around the second portions of the core assembly and have axes of the windings extending in parallel with the rotation axis of the spindle motor; and
   a yoke magnetically coupling the core pieces with each other,
   wherein the permanent magnet is a pole-anisotropic magnet multipolarized.

36. The spindle motor as claimed in claim 35, further comprising a hub holding the permanent magnet,
   said hub comprising a non-magnetic material.

37. A spindle motor, comprising:
   a permanent magnet multipolarized in a circular direction of the permanent magnet, said permanent magnet generating magnetic fluxes in radial directions of the spindle motor;
   a core assembly having core pieces, said core pieces respectively comprising first portions that are circularly arranged and face the permanent magnet via a gap, and second portions guiding magnetic fluxes in parallel with a rotation axis of the spindle motor;
   windings that are turned around the second portions of the core assembly and have axes of the windings extending in parallel with the rotation axis of the spindle motor; and
   a yoke magnetically coupling the core pieces with each other;
   wherein each of the windings comprises a conductive thin film that is turned around one of second portions of the armature core a plurality of times.

38. A spindle motor comprising:
   a permanent magnet multipolarized in a circular direction of the permanent magnet, said permanent magnet generating magnetic fluxes in radial directions of the spindle motor;
   a core assembly having core pieces, said core pieces respectively comprising first portions that are circularly arranged and face the permanent magnet via a gap, and second portions guiding magnetic fluxes in parallel with a rotation axis of the spindle motor;
   windings that are turned around the second portions of the core assembly and have axes of the windings extending in parallel with the rotation axis of the spindle motor; and
   a yoke magnetically coupling the core pieces with each other,
   wherein each of the windings comprises a spiral conductive pattern formed by plating.

39. A spindle motor comprising:
   a permanent magnet multipolarized in a circular direction of the permanent magnet, said permanent magnet generating magnetic fluxes in radial directions of the spindle motor;

a core assembly having core pieces, said core pieces respectively comprising first portions that are circularly arranged and face the permanent magnet via a gap, and second port ions guiding magnetic fluxes in parallel with a rotation axis of the spindle motor;

windings that are turned around the second portions of the core assembly and have axes of the windings extending in parallel with the rotation axis of the spindle motor;

a yoke magnetically coupling the core pieces with each other; and a resin molding member that covers the second portions of the core assembly and the windings.

40. A spindle motor comprising:

a permanent magnet multipolarized in a circular direction of the permanent magnet, said permanent magnet generating magnetic fluxes in radial directions of the spindle motor;

a core assembly having core pieces, said core pieces respectively comprising first portions that are circularly arranged and face the permanent magnet via a gap, and second portions guiding magnetic fluxes in parallel with a rotation axis of the spindle motor;

windings that are turned around the second portions of the core assembly and have axes of the windings extending in parallel with the rotation axis of the spindle motor; and a yoke magnetically coupling the core pieces with each other, wherein one end of each of the windings is connected to a corresponding one of the second portions.

41. A spindle motor comprising:

a permanent magnet multipolarized in a circular direction of the permanent magnet, said permanent magnet generating magnetic fluxes in radial directions of the spindle motor;

a core assembly having core pieces, said core pieces respectively comprising first portions that are circularly arranged and face the permanent magnet via a gap, and second portions guiding magnetic fluxes in parallel with a rotation axis of the spindle motor;

windings that are turned around the second portions of the core assembly and have axes of the windings extending in parallel with the rotation axis of the spindle motor;

a yoke magnetically coupling the core pieces with each other; and a layer in which the windings are patterned, said layer comprising through holes into which the second portions of the core assembly are inserted.

42. A disk drive comprising:

a disk that stores information;

a spindle motor for rotating the disk;

a head assembly that performs read/write operations on the disk;

a head positioning actuator supporting the head assembly and positioning the head assembly on a desired position on the disk; and control means for receiving read signals from the head assembly and providing write signals to the head assembly and for controlling the spindle motor and the head positioning actuator, the spindle motor including:

a permanent magnet multipolarized in a circular direction of the permanent magnet, said permanent magnet generating magnetic fluxes in a radial direction of the spindle motor;

a core assembly having core pieces, said core pieces respectively comprising first portions that are circularly arranged and face the permanent magnet via a gap, and second portions guiding magnetic fluxes in parallel with a rotation axis of the spindle motor;

windings that are turned around the second portions of the core assembly and have axes of the windings extending in parallel with the rotation axis of the spindle motor; and a yoke magnetically coupling the core pieces with each other; and a housing accommodating the disk, the spindle motor, the head assembly and circuit means, said housing having dimensions of approximately 85.6 mm× 54 mm×5 mm.

43. The disk drive as claimed in claim 42, further comprising a chassis housing the disk, the spindle motor, the head assembly and the control means, said chassis comprising a chassis base, and said stator yoke being a part of the chassis base.

* * * * *